(12) United States Patent
Henderson et al.

(10) Patent No.: US 7,690,325 B2
(45) Date of Patent: Apr. 6, 2010

(54) METHOD AND APPARATUS FOR DEPOSITING MATERIAL ONTO A SURFACE

(75) Inventors: Eric R. Henderson, Ames, IA (US); Juntao Xu, Ames, IA (US); Michael P. Lynch, San Diego, CA (US); Curtis L. Mosher, Ames, IA (US); Janice Lillian Huff, Houston, TX (US); Saju Rappai Nettikadan, Ames, IA (US)

(73) Assignee: Bioforce Nanosciences, Inc., Ames, IA (US)

( * ) Notice: Subject to any disclaimer, the term of this patent is extended or adjusted under 35 U.S.C. 154(b) by 1275 days.

(21) Appl. No.: 11/120,042

(22) Filed: Apr. 29, 2005

(65) Prior Publication Data

US 2005/0266149 A1 Dec. 1, 2005

Related U.S. Application Data

(60) Provisional application No. 60/566,898, filed on Apr. 30, 2004.

(51) Int. Cl.
*B05C 5/00* (2006.01)
*B05B 7/06* (2006.01)
*B05C 3/00* (2006.01)

(52) U.S. Cl. .................. 118/300; 118/313; 118/315; 118/410

(58) Field of Classification Search .......... 118/300, 118/401, 313–315; 422/100, 63, 65, 124.29, 422/124.3; 436/180, 174, 43, 49; 73/864.01, 73/864.02, 864.14; 401/137–138, 145, 253, 401/286; 29/558; 417/413.2, 413.3
See application file for complete search history.

(56) References Cited

U.S. PATENT DOCUMENTS 3,164,304 A 1/1965 Jager et al.

(Continued)

FOREIGN PATENT DOCUMENTS

EP 1388369 2/2004

(Continued)

OTHER PUBLICATIONS

"High Speed Nano Fountain Pen (23014)" http://ttp.northwestern.edu/abstracts/viewabs.php?id=178&cat=124, 2 pages.

(Continued)

*Primary Examiner*—Yewebdar T Tadesse
(74) *Attorney, Agent, or Firm*—Michael Best & Friedrich

(57) ABSTRACT

Some embodiments of the present invention provide an apparatus and method in which material is deposited upon a surface from an elongated beam having an aperture defined therein through which the material is moved by passive adsorption. The elongated beam can be substantially planar along substantially its entire length, can be oriented at an acute angle with respect to the surface during deposition processes, and can have a length no greater than about 2 mm. In some embodiments, the aperture can be elongated, can extend from a material reservoir to a location short of the terminal end of the elongated beam or through the terminal end of the elongated beam, and can have a portion extending through the thickness of the elongated beam.

15 Claims, 13 Drawing Sheets

U.S. PATENT DOCUMENTS

| | | | |
|---|---|---|---|
| 3,568,735 A | 3/1971 | Lancaster |
| 5,055,263 A | 10/1991 | Meltzer et al. |
| 5,150,392 A | 9/1992 | Hohn et al. |
| 5,306,510 A | 4/1994 | Meltzer et al. |
| 5,443,791 A | 8/1995 | Cathcart et al. |
| 5,547,839 A | 8/1996 | Dower et al. |
| 5,658,802 A | 8/1997 | Hayes et al. |
| 5,679,773 A | 10/1997 | Holmes et al. |
| 5,770,151 A | 6/1998 | Roach et al. |
| 5,807,522 A | 9/1998 | Brown et al. |
| 5,963,367 A | 10/1999 | Aksyuk et al. |
| 5,981,733 A | 11/1999 | Gamble et al. |
| 5,985,356 A | 11/1999 | Schultz et al. |
| 5,993,627 A | 11/1999 | Anderson et al. |
| 6,024,925 A | 2/2000 | Little et al. |
| 6,033,911 A | 3/2000 | Schultz et al. |
| 6,083,763 A | 7/2000 | Balch |
| 6,087,274 A | 7/2000 | Tonucci et al. |
| 6,101,946 A | 8/2000 | Martinsky |
| 6,121,048 A | 9/2000 | Zaffaroni et al. |
| 6,136,269 A | 10/2000 | Winkler et al. |
| 6,228,659 B1 | 5/2001 | Kowallis et al. |
| 6,255,119 B1 | 7/2001 | Baier |
| 6,350,609 B1 | 2/2002 | Morozov et al. |
| 6,395,554 B1 | 5/2002 | Regan et al. |
| 6,551,557 B1 | 4/2003 | Rose et al. |
| 6,592,819 B1 | 7/2003 | Ogura |
| 6,624,129 B1 | 9/2003 | Borch et al. |
| 6,635,311 B1 | 10/2003 | Mirkin et al. |
| 6,635,469 B1 | 10/2003 | Litt et al. |
| 6,722,395 B2 | 4/2004 | Overbeck et al. |
| 6,827,979 B2 | 12/2004 | Mirkin et al. |
| 6,867,443 B2 | 3/2005 | Liu et al. |
| 2002/0094304 A1* | 7/2002 | Yang et al. .................. 422/100 |
| 2002/0122873 A1 | 9/2002 | Mirkin et al. |
| 2003/0049381 A1 | 3/2003 | Mirkin et al. |
| 2003/0068446 A1 | 4/2003 | Mirkin et al. |
| 2003/0148538 A1 | 8/2003 | Ng |
| 2003/0148539 A1 | 8/2003 | Van Dam et al. |
| 2003/0157254 A1 | 8/2003 | Mirkin et al. |
| 2003/0162004 A1 | 8/2003 | Mirkin et al. |
| 2003/0185967 A1 | 10/2003 | Eby et al. |
| 2004/0008330 A1 | 1/2004 | Mirkin et al. |
| 2004/0026681 A1 | 2/2004 | Cruchon-Dupeyrat et al. |
| 2004/0028814 A1 | 2/2004 | Mirkin et al. |
| 2004/0037959 A1 | 2/2004 | Mirkin et al. |
| 2004/0223886 A1 | 11/2004 | Liu et al. |
| 2005/0035983 A1 | 2/2005 | Cruchon-Dupeyrat et al. |
| 2005/0172704 A1 | 8/2005 | Mirkin et al. |
| 2005/0181132 A1 | 8/2005 | Mirkin et al. |
| 2005/0191434 A1 | 9/2005 | Mirkin et al. |
| 2005/0236566 A1 | 10/2005 | Liu et al. |
| 2005/0114673 A1 | 12/2005 | Liu et al. |

FOREIGN PATENT DOCUMENTS

| | | |
|---|---|---|
| EP | 1402953 | 3/2004 |
| WO | WO 87/07377 | 12/1987 |
| WO | WO 95/35505 | 12/1995 |
| WO | WO 98/20020 | 5/1998 |
| WO | WO 99/44063 | 9/1999 |
| WO | WO 00/01798 | 1/2000 |
| WO | WO 00/41213 | 7/2000 |
| WO | 0103837 | 1/2001 |
| WO | WO 01/91855 | 12/2001 |
| WO | 0200348 | 1/2002 |
| WO | WO 02/055199 | 7/2002 |
| WO | WO 03/001633 | 1/2003 |
| WO | WO 03/003277 | 1/2003 |
| WO | WO 03/004275 | 1/2003 |
| WO | WO 03/036767 | 5/2003 |
| WO | WO 03/048314 | 6/2003 |
| WO | WO 03/086630 | 10/2003 |
| WO | WO 03/086631 | 10/2003 |
| WO | 03097238 | 11/2003 |
| WO | WO 2004/033480 | 4/2004 |
| WO | WO 2004/034028 | 4/2004 |

OTHER PUBLICATIONS

Amro, et al., "Patterning surfaces using tip-directed displacement and self-assembly" *Langmuir* (2000) 16:3006-3009.

Belaubre, P. et al., "Fabrication of biological microarrays using microcantilevers" *Applied Physics Letters*,. May 5, 2003, 82(18):3122-3124.

Bruckbauer, et al., "Writing with DNA and Protein Using a Nanopipet for Controlled Delivery" *JACS*, 2002, A-B.

Bruckbauer, A. et al., "Multicomponent submicron features of biomolecules created by voltage controlled deposition from a nanopipet," J. Amer. Chem. Soc. (2003) 125:9834-9839.

Bullen, D. et al., "Design, fabrication, and characterization of thermally actuated probe arrays for dip pen nanolithography," J. Microelec. Systems (2004) 13(4):599-602.

Bullen, D. et al., "Development of parallel dip pen nanolithography probe arrays for high throughput nanolithography," Materials Research Society Symposium of Fall 2002 (Dec. 2-6, 2002) 10 pages.

Bullen, D. et al., "Thermo-mechanical optimization of thermally actuated cantilever arrays," Smart Electronics, MEMS, and Nanotechnology Conference (4700), SPIE's 9th Annual International Symposium on Smart Structures and Materials, San Diego, CA (Mar. 17-21, 2002) 8 pages.

Deladi, S. et al., "Micromachined fountain pen for atomic force microscope-based nanopatterning," App. Phys. Lett. (2004) 85(22):5361-5363.

Ginger, D.S. et al., "The evolutin of dip-pen nanolithography," Angewandte Chemie International Edition (2004) 43(1):30-45.

Hong, M.-H. et al., "Scanning nanolithography using a material-filled nanopipette," App. Phys. Lett. (2000) 77(16):2604-2606.

Kim, K.-H. et al., "A novel AFM chip for fountain pen nanolithography—design and microfabrication," Materials Research Society Symposium Proceedings, 2003 Fall MRS Meeting, vol. 782, A.5.56.1 (2004).

Kim, K.-H. et al., "Massively parallel multi-tip nanoscale writer with fluidic capabilities—fountain pen nanolithography (FPN)," Proceedings of the 2003 SEM Annual Conference and Exposition on Experimental and Applied Mechanics, Charlotte, NC (Jun. 2-4, 2003) 4 pages.

Kim, K.-H. et al., A nanofountain probe with sub-100 nm molecular writing resolution, Small (2005) 1(6):632-635.

Kim, Y. et al., "Parallel recording array head of nano-aperture flat-tip probes for high-density near-field optical data storage," Japan J. Appl. Phys. (2001) 40:1783-1789.

Kim, Y. et al., Fabrication of micro-pyramidal probe array with aperture for near-field optical memory applications, Japan J. Appl. Phys. (2000) 39:1538-1541.

Lewis, A. et al., "Fountain pen nanochemistry: atomic force control of chrome etching," App. Phys. Letters (1999) 75(17):2689-2691.

Meister, et al., "Nanoscale Dispensing of Liquids through Cantilevered Probes" *MNE '02*, Lugano, Switzerland, Sep. 16-19, 2002.

Nakajima, K. et al., "High resolution beyond aperture size achieved by hybrid SNOM/STM system," RIKEN Review (2001) 38:52-56.

Pourciel, J. et al., "Deposition of picoliter of liquid by using a cantilever-based microsystem," 6 pages, Published prior to Apr. 29, 2003.

Reese, M. et al., "Microfabricated fountain pens for high-density DNA arrays," Department of Applied Physics, California Institute of Technology, Pasadena, CA (2003) 13:2348-2352.

Ryu, K.S. et al., "A method for precision patterning of silicone elastomer and its applications," J. Microelec. Systems (2004) 13(4):568-575.

Ryu, K.S. et al., "Integrated microfluidic linking chip for scanning probe nanolithography," Applied Physics Letters (2004) 85(1):136-138.

Schwartz, et al. "Meniscus Force Nanografting: Nanoscopic Patterning of DNA" *Langmuir*, 2001, 17:5971-5977.

Tsai, J. et al., "A silicon micromachined pin for contact droplet printing," Proceedings of Microelectromechanical Systems, Kyoto, Japan (Jan. 19-23, 2003) 295-298.

Tsai, J. et al., "A silicon micromachined pin for contact droplet printing," Proceedings of the Second Joint EMBS/BMES Conference, Houston, Texas (Oct. 23-26, 2002) 1632-1633.

Wang, X. et al., "Scanning probe with elastomeric (PDMS) tip for scanning probe microcontact printing (SP-CP)," Proceedings of Transducers: The 12th International Conference on Solid State Sensors, Actuators and Microsystems, Boston, MA (Jun. 8-12, 2003) 1003-1006.

WITec Wissenschaftliche Instrumente und Technologie GmbH, Cantilever-SNOM-Sensors (2000) 2 pages.

Ying, et al., "Programmable Delivery of DNA through a Nanopipet" *Anal. Chem.*, 2002, 74:1380-1385.

Zhang, H. et al., "Dip pen nanolithography stamp tip," Nano Letters (2004) 4(9):1649-1655.

Zhang, M. et al., A MEMS nanoplotter with high-density parallel dip-pen nanolithography probe arrays, Nanotechnology (2002) 13:212-217.

Zou, J. et al., "A mould-and-transfer technology for fabricating scanning probe microscopy probes," J. Micromec. Microeng. (2004) 14:204-211.

\* cited by examiner

METHOD AND APPARATUS FOR DEPOSITING MATERIAL ONTO A SURFACE

CROSS-REFERENCE TO RELATED APPLICATION

Priority is hereby claimed to U.S. provisional patent application No. 60/566,898, filed Apr. 30, 2004, the entire contents of which are incorporated herein by reference.

BACKGROUND

A number of methods and apparatuses exist for generating arrays and other patterns of biological material upon a surface. Some advantages of such methods and apparatuses (and of microarray technology in general) include increased throughput afforded by parallel processing and reductions in the amounts of materials and labor required for sample processing, which can result in increased productivity and reductions in costs. Existing apparatuses and methods for deposition of various materials at small scales (e.g., on the scale of tens of microns) have had mixed success.

Typically, the design of conventional deposition apparatuses and methods is dependent on desired resolution and spot size. Parameters that can be varied in designing such deposition apparatuses and methods can include the shape and size of the apparatus used for deposition, and the orientation of the apparatus with respect to the surface onto which material is to be deposited. In some cases, existing deposition apparatuses are energized (e.g., with an electromotive or electroosmotic force) to drive the deposition process. Such apparatuses are typically relatively complex and/or expensive. Also, in some cases (e.g., AFM probes), the deposition apparatus is shaped to include a protuberance at or near a tip of the apparatus to direct material toward a surface onto which the material is to be deposited. The protuberance can be oriented substantially orthogonally with respect to the surface or at a relatively steep angle with respect to the surface.

SUMMARY

The present invention generally relates to methods and apparatuses for depositing material onto a surface, and in some embodiments, to methods and apparatuses for depositing biological material onto a surface. The material can be deposited onto a surface to create spots, lines, or other shapes of material in any arrangement on a surface (e.g., in an array or other pattern, in a format that is random or has no pattern, and the like). In some embodiments, the material can be deposited in micrometer and/or nanometer-scale arrays or patterns. Also, the material deposited can include biological material, in which case arrays or other deposit formats can be produced for ultraminiaturized bioanalytical testing.

Some embodiments of the present invention provide an apparatus for depositing material onto a surface, wherein the apparatus comprises a base; a substantially planar elongated beam having a proximal portion extending from the base and a distal portion located a distance from the proximal portion such that the elongated beam forms a cantilever with respect to the base, the elongated beam having a length of no greater than about 2 mm; and an elongated aperture defined in the elongated beam, the elongated aperture at least partially defining an inner surface dimensioned to move liquid along the elongated aperture by passive adsorption, the elongated aperture having a distal portion from which material is deposited onto the surface.

In some embodiments, an apparatus for depositing material onto a surface is provided, and comprises a base; an elongated beam extending from the base in a cantilevered configuration, the elongated beam having a substantially planar upper surface along substantially its entire length; a substantially planar lower surface along substantially its entire length; a proximal portion extending from the base; and a distal portion located a distance from the proximal portion, the elongated beam oriented at an acute angle with respect to the surface; and an elongated aperture defined in the elongated beam, the elongated aperture at least partially defining an inner surface adapted to facilitate movement of the material along the elongated aperture by passive adsorption, and a distal portion adapted for at least one of material loading into the elongated beam and material deposition from the elongated beam.

Some embodiments of the present invention provide a method for depositing material onto a surface, wherein the method comprises providing an elongated beam extending from a base and having a proximal portion adjacent the base and a distal portion located a distance from the proximal portion, the elongated beam being substantially planar along its length; moving the material along an elongated aperture defined in the elongated beam and toward the distal portion of the elongated beam by passive adsorption, the elongated aperture having a distal portion from which material is deposited onto the surface; moving the distal portion of the elongated beam toward the surface; and depositing the material onto the surface at a location no greater than about 2 mm from the base.

In some embodiments, a method for depositing material onto a surface is provided, and comprises providing a base; providing an elongated beam that extends from the base in a cantilevered configuration, the elongated beam being substantially planar along substantially its entire length and having a proximal portion adjacent the base and a distal portion located a distance from the proximal portion; providing an elongated aperture defined in the elongated beam, the elongated aperture having a distal portion from which material is deposited onto the surface; orienting the distal portion of the elongated beam at an acute angle with respect to the surface; moving the material along the elongated aperture toward the distal portion of the elongated aperture by passive adsorption; and depositing the material from the distal portion of the elongated aperture toward the surface.

Other features and aspects of the invention will become apparent by consideration of the detailed description and accompanying drawings.

DETAILED DESCRIPTION

Figure 1:
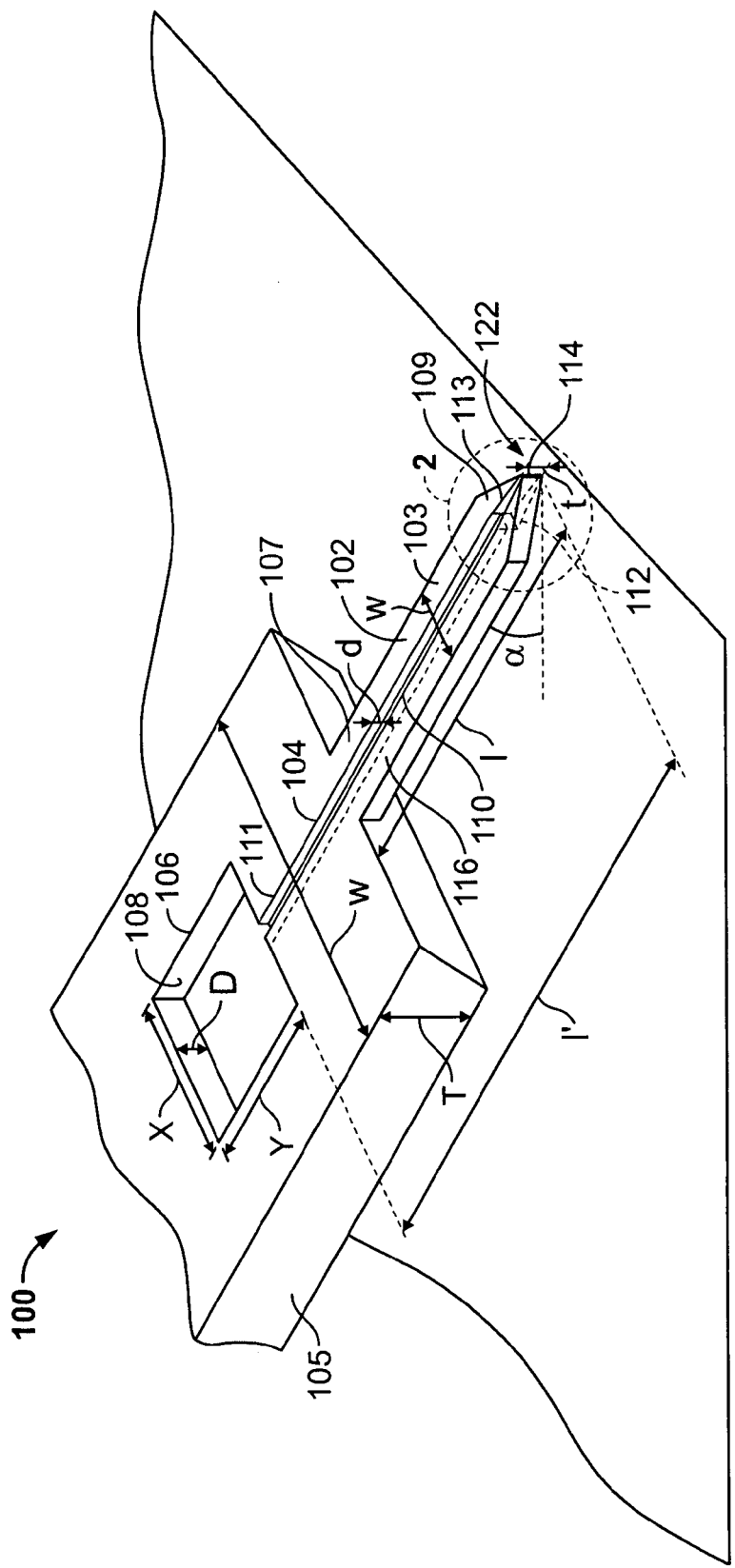
FIG. 1 is a perspective view of a deposition apparatus according to an embodiment of the present invention.

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the item or items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. In addition, terms such as "front," "rear," "top," "bottom," and the like are only used to describe elements as they relate to one another, but are in no way are alone meant to recite specific orientations of the apparatus, to indicate or imply necessary or required orientations of the apparatus, or to specify how the invention described herein will be used, mounted, displayed, or positioned in use.

The present invention generally relates to methods and apparatuses for depositing material onto a surface, and in some embodiments, to methods and apparatuses for depositing biological material onto a surface. The material can be deposited onto a surface to create spots, lines, or other shapes of material in any arrangement on a surface (e.g., in an array or other pattern, in a format that is random or has no pattern, and the like). The arrays, patterns or other formats of deposits created using the methods and apparatuses of the present invention can be used in a variety of analytical tests, including, but not limited to at least one of the following: single (or few) cell screening and minimally invasive cell testing; protein diagnostics, such as in cases where volumes are limited (e.g., neonatal testing); environmental testing; bioterrorism countermeasures; forensics; and high throughput screening (HTS), such as in cases of drug discovery using combinatorial chemical libraries. In addition, the deposition apparatuses and methods of the present invention can be integrated with "lab-on-a-chip" concepts to create more complex tools for processing and depositing materials onto a surface. For example, in some embodiments, deposition apparatuses of the present invention can be incorporated into a processing chip that accepts a cellular sample, fractionates the sample into fractionated component, and deposits the fractionated components onto a surface.

Arrays and patterns created using the deposition apparatuses and methods of the present invention can produce drop volumes in the ranges of picoliters, femtoliters and attoliters. For example, in some embodiments, the drop volume produced is about 4 femtoliters. In some embodiments, the drops or spots produced can be substantially round in shape. In addition, the deposition apparatuses and methods of the present invention can be used to produce an array of spots of material, with an average spot diameter ranging from a single molecule to about 100 microns. In some embodiments, the average spot diameter ranges from about 0.01 microns to about 100 microns. Also, in some embodiments, the average spot diameter produced ranges from about 0.25 microns to about 6 microns (5 microns being a common average spot diameter). Furthermore, in some embodiments, the average spot diameter produced ranges from about 0.25 microns to about 5 microns. Such average spot diameters can correspond to between about 1,000 and about 6000,000 average-size protein molecules per spot. As another example, in some embodiments the average spot diameter produced is about 2.2 microns.

As mentioned above, methods and apparatuses according to some embodiments of the present invention are adapted to deposit one or more lines of material onto a substrate. In such embodiments, the line can have a constant or varying thickness, with a minimum line width ranging from about 0.2 microns to about 100 microns. In some embodiments, the minimum line width can range from about 2 microns to about 6 microns (5 microns being a common minimum line width). Also, in some embodiments, the distance between adjacent spots or lines created by methods and apparatuses of the present invention is less than about 10 microns, such as an average distance between adjacent spots or lines of about 5 microns.

Arrays and patterns created using methods and apparatuses of the present invention can be configured to be analyzed or interrogated using a broad range of techniques, including, but not limited to, AFM, fluorescence methods, surface plasmon resonance (SPR), mass spectrometry, interferometry. For example, protein-protein interaction arrays can be read using conventional (e.g., fluorescence) readout methods. This can be possible because, although spot sizes produced may be smaller than half the wavelength of the investigating light being used and can therefore exceed the diffraction limit of the light being used, the separation (i.e., pitch) between spots can be 1 micron or more, allowing sub-micron spots to be individually resolved using conventional readout techniques.

Many existing bio-patterning experiments in the micron to submicron spatial scale have been carried out using microcantilever-based atomic force microscopy (AFM) probes. In some cases, this approach can be attractive because AFM probes are readily available, and micro-cantilever AFM probes are typically well adapted for devices and systems capable of measuring and controlling the force between the deposition tool and surface. However, since AFM probes are specifically designed for imaging purposes, their structure, material and geometry are not optimized for materials patterning, especially for biological materials. With an AFM probe, the sample to be deposited forms a thin molecular layer on the tip surface and around the base area of the AFM probe. When placed in contact with a surface, the molecules of the layer migrate from the tip onto the surface. The amount of material transferred directly correlates to the time of surface contact. Thus, this deposition process is diffusion-limited and time-dependent. Although this deposition process can be suitable for small organic species, it can be problematic for larger biomolecules, such as proteins, large nucleic acids, and other biomolecular ensembles. Furthermore, since the reservoir of material to be deposited is limited to the surface layer described above, the sample depletes, resulting in the need to reload the AFM probe during protracted patterning. Finally, the geometry of a sharp AFM tip is not suitable for transportation of macromolecules from the base area to the end of the tip where surface contact is made. As a result, biomolecular arrays created with AFM probes can produce spots that are devoid of patterning material in the centers of the spots.

Other existing deposition devices include pin tools fabricated from metal or silicon that can be used to create microarrays having minimum spot diameters in the range of tens to hundreds of microns. Some conventional pin tools are fabricated from silicon using deep reactive ion etching (DRIE) to fabricate deep (e.g., about 500 microns) fluid channels in the pin tool. The pin tools are typically operated by allowing material to flow along such channels at a substantially orthogonal orientation or at a relatively steep angle with respect to the surface onto which the material is to be deposited. Because the pin tools are oriented substantially orthogonally with respect to the surface, it can be difficult to apply a force feedback mechanism for measuring the contact force of the pin tool on the surface. In addition, as described herein, some deposition apparatuses of the present invention use bending or deflection of an elongated beam to measure force feedback between the elongated beam and the surface onto which material is to be deposited. However, bending of pin tools is typically undesirable, and call hinder deposition performance.

Furthermore, conventional pin tools are generally designed to be front-loaded, such that each pin tool can only load one type of material at a time. Therefore, to achieve printing of multiple materials, multiple pin tools are mounted on a pin holder. The space between each pin tool is typically limited by the geometry of the pin holder, and is typically at least about 2 mm. This is partially due to the fact that each conventional pin tool is typically about 1.4 mm wide. In addition, each conventional pin tool is typically about 4 or 5 cm in length, with a pointed pin tip that is several millimeters in length.

The deposition apparatuses and methods of the present invention can allow for reliable deposition and patterning of large molecular species, reduced reloading requirements, and/or featured back-loading, a process that can facilitate future parallelization of the process and elimination of washing steps. In addition, the deposition apparatuses and methods of the present invention can allow for the deposition and patterning of very large molecules (e.g., molecules with molecular weights ranging in the hundreds of thousands of Daltons) by a dispensing process rather than a diffusion process. That is, the deposition apparatuses and methods of the present invention can allow for substantially time-independent deposition of material.

FIG. 1 illustrates a deposition apparatus 100 according to an embodiment of the present invention. The illustrated deposition apparatus 100 can be used to deposit material (including biological material) onto a surface 101. The deposition apparatus 100 shown in FIG. 1 includes an elongated beam 102 that is substantially planar along a majority of its length l, including at a location on the elongated beam 102 from which material is deposited onto the surface 101. The elongated beam 102 can be further defined by a width w and a thickness t. As also shown in FIG. 1, the elongated beam 102 can include one or more elongated apertures 104 defined therein. As used herein and in the appended claims, the term "aperture" 104 includes, without limitation, a channel, a gap, a recess, a groove, a blind-bore, a through-bore, a conduit, and the like, and any combination of such features. For example, the elongated aperture 104 is shown in FIG. 1 as being defined in an upper surface 103 of the elongated beam 102.

With continued reference to FIG. 1, in some embodiments the elongated aperture 104 extends along at least a portion of the length of the elongated beam 102 to and in fluid communication with a reservoir 106. In some embodiments, the deposition apparatus 100 can further include a base 105 from which the elongated beam 102 extends. The reservoir 106 and/or the elongated aperture 104 can be at least partially located in the base 105, which can include a width W and a thickness T. In some embodiments, the width w and/or thickness t of the elongated beam 102 are smaller than the width W and thickness T of the base 105, respectively. However, in some embodiments, the width w and/or thickness t of the elongated beam 102 is the same as the width W and the thickness T of the base 105, respectively.

Figure 2:
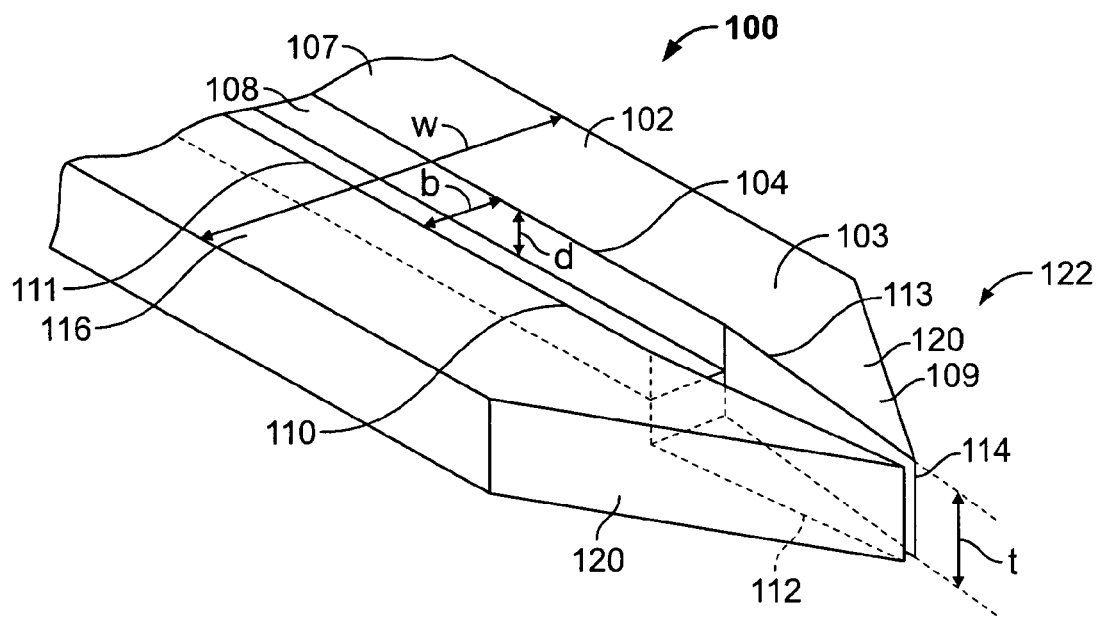
FIG. 2 is a detail perspective view of the deposition apparatus of FIG. 1.
Figure 3:
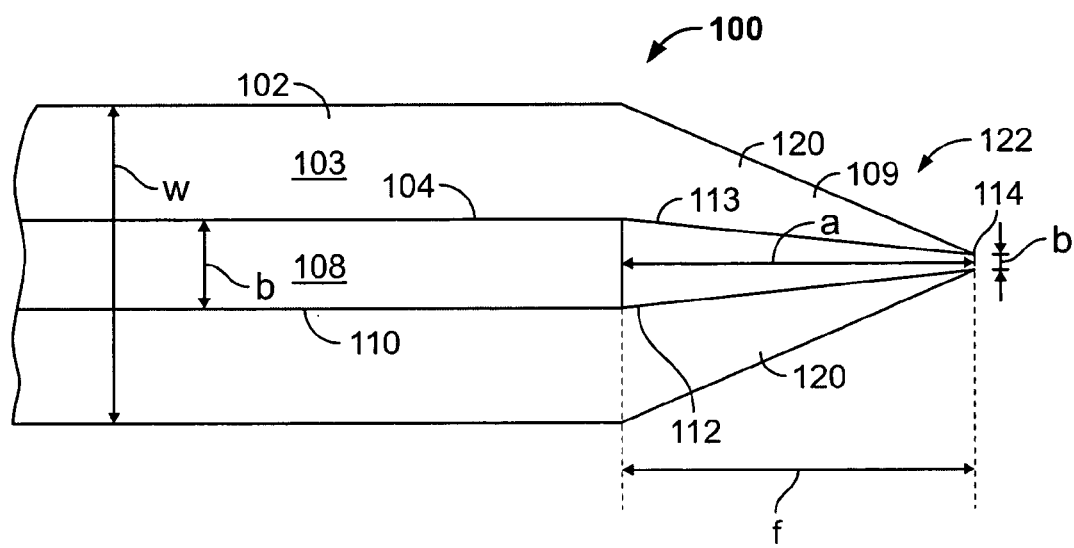
FIG. 3 is a top view of the deposition apparatus of FIGS. 1 and 2.

As best shown in FIGS. 2 and 3, the elongated aperture 104 can have a depth d and a width b. With reference to FIG. 1, the reservoir 106 can have a width X, a length Y, and a depth D. In the embodiment of the deposition apparatus 100 illustrated in FIGS. 1-3, the reservoir 106 is substantially square is shape, such that the width X and the length Y of the reservoir 106 are substantially equal. It should be noted however, that the reservoir 106 can have any other shape desired, including without limitation, a rectangular, triangular, circular, oval, star, irregular, or any other shape (and combinations thereof) without departing from the spirit and scope of the present invention.

In some embodiments, the depth d of the elongated aperture 104 and the depth D of the reservoir 106 are substantially the same. Alternatively, in some embodiments the depth d of the elongated aperture 104 is greater or less than the depth D of the reservoir 106. Furthermore, as shown in FIG. 1, the width b of the elongated aperture 104 is less than one-third of the width w of the elongated beam 102. It should be noted, however, that the width b of the elongated aperture 104 can occupy a greater or lesser proportion of the width w of the elongated beam 102 without departing from the spirit and scope of the present invention.

As used herein and in the appended claims, the terms "proximal" and "distal" are used to refer to relative locations or positions with respect to an origin. That is, the term "proximal" is used to describe any location or position that is nearer the origin, whereas the term "distal" is used to describe any location or position that is farther from the origin. For example, in the embodiment illustrated in FIGS. 1-3, the elongated beam 102 includes a proximal portion 107 coupled to the base 105, and a distal portion 109 from which material can leave the deposition apparatus 100 to be deposited onto the surface 101. In addition, and as also shown in FIGS. 1-3, the elongated aperture 104 includes a proximal portion 111 adjacent the proximal portion 107 of the elongated beam 102 (and in some embodiments, in fluid communication with the reservoir 106), and a distal portion 113 adjacent the distal portion 109 of the elongated beam 102. In some embodiments (see, for example, the embodiment of FIGS. 1-3), the distal portion 113 of the elongated aperture 104 extends through a terminal end 114 of the elongated beam 102, as shown in FIGS. 1-3.

The deposition apparatus 100 illustrated in FIGS. 1-3 has a single elongated aperture 104 extending along the length l of the elongated beam 102. In other embodiments, the deposition apparatus 100 can have a plurality of elongated apertures 104 that each extend along at least a portion of the length l of the elongated beam 102 toward the terminal end 114 of the elongated beam 102. In those embodiments in which two or more elongated apertures 104 are located in each elongated beam 102, the elongated apertures 104 can be parallel or substantially parallel to one another along all or a portion of their lengths. Also in such embodiments, the elongated apertures 104 can converge at the distal portion 113 of the elongated beam 102 or can remain spaced from one another substantially entirely to the terminal end 114 of the elongated beam 102. In each such case, the end of each elongated aperture 104 at the distal portion 113 of the elongated beam 102 can have a constant or non-constant width b (e.g., a tapering width b as shown in the embodiment of FIGS. 1-3).

As used herein and in the appended claims, the term "base" 105 refers to a substrate, platform or other supporting structure to which the proximal portion 107 of the elongated beam 102 is coupled. In some embodiments, the "base" 105 is a structure to which the elongated beam 102 is coupled, and is a location at which the deposition apparatus 100 can be coupled to other deposition hardware (e.g., a NANOARRAYER™ deposition system, not shown, available from BioForce Nanosciences, Inc., Ames, Iowa). Such deposition hardware can control movement of the elongated beam 102 relative to the surface 101 during a deposition process. In some embodiments, the "base" 105 can include a portion of the deposition hardware. In other words, in some embodiments of the present invention, the elongated beam 102 is coupled directly to a portion of the deposition hardware, and that portion of the deposition hardware serves as a "base" 105 of the deposition apparatus 100.

In some embodiments of the present invention, the deposition hardware (e.g., the NANOARRAYER™ deposition system, not shown) to which the deposition apparatus 100 can be coupled includes a precision motion system. Such a system can be located in an environmentally regulated chamber for surface patterning. In some embodiments, surface contact force is controlled via an optical lever detection system as described below. A high magnification vision system can be used to monitor sample loading and the deposition process. Any part or substantially all of the deposition process can be automated or controlled manually using custom designed software (e.g., NANOWARE™, not shown, available from BioForce Nanosciences, Inc., Ames, Iowa) and/or with a graphical user interface (GUI).

With reference again to the illustrated embodiment of FIGS. 1-3, the elongated beam 102 can extend from the base 105 to form a cantilever. That is, in some embodiments, the base 105 is substantially thicker and/or wider than the elongated beam 102 (i.e., the thickness T is greater than the thickness t, and/or the width W is greater than the width w), which allows the reservoir 106 to be deeper and/or wider than the elongated aperture 104 (i.e., the depth D is greater than the depth d, and/or the width X is greater than the width w). Furthermore, such a relationship between the elongated beam 102 and the base 105 can provide structural support and rigidity to the cantilevered elongated beam 102. However, it should be noted that the base 105 and elongated beam 102 can have a uniform thickness (i.e., the thickness T is equal to the thickness t) and/or a uniform width (i.e., the width W is equal to the width w).

In some embodiments, such as in the embodiment of FIGS. 1-3, at least a portion of the reservoir 106 can be located in the base 105 of the deposition apparatus 100. Also, in some embodiments, at least a portion of the reservoir 106 can be located in the elongated beam 102 (e.g., in the proximal portion 107 of the elongated beam 102).

The reservoir 106 and the elongated aperture 104 can collectively define an inner surface 108 of the elongated beam 102 exposed to the material to be deposited. The material properties (e.g., hydrophilicity, hydrophobicity, and other properties) of the inner surface 108 can control the loading and/or deposition of the material to be deposited. In addition, the elongated beam 102 and/or the base 105 can include an outer surface 116 (which generally refers to any other surfaces of the base 105 and the elongated beam 102, including the upper surface 103 of the elongated beam 102), the material properties of which can control loading and/or deposition of the material by substantially preventing the material from flowing out of the reservoir 106 or the elongated aperture 104 along the outer surface 116.

As used herein and in the appended claims, "material properties" of the inner surface 108 can refer to inherent material properties of the material defining the inner surface 108, or material properties that result from a variety of manufacturing processes, including a variety of surface modification treatments (e.g., a chemical treatment such as ozone treatment, and the like).

As also used herein and in the appended claims, the terms "upstream" and "downstream" refer generally to the overall direction of fluid movement through the deposition apparatus 100 from the base 105 toward the terminal end 114. That is, the term "upstream" is used to describe any location, element or process that occurs prior to the point or area being referred to relative to the direction of fluid movement during deposition, whereas the term "downstream" is used to describe any location, element or process that occurs subsequent to the point or area of reference with respect to fluid movement during deposition. For example, in embodiments employing a reservoir 106, the reservoir 106 is upstream of the elongated aperture 104.

Figure 28:
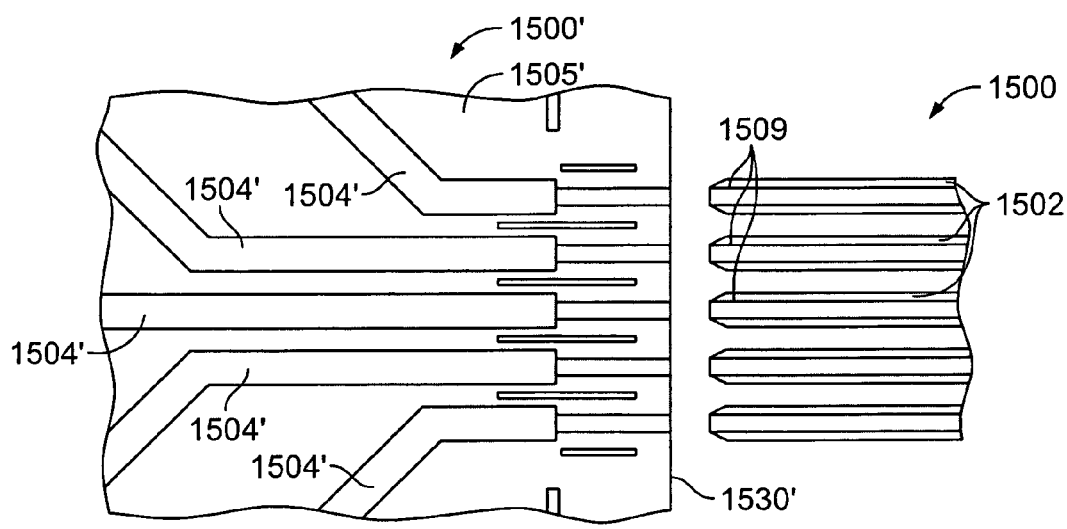
FIG. 28 is a top view of the deposition apparatus of FIGS. 25 and 26, shown in a front-loading process.

As also used herein and in the appended claims, the term "loading" refers to front-loading or back-loading of the deposition apparatus 100. The term "front-loading" can refer to immersing at least a portion of the distal portion 109 of the elongated beam 102 in a liquid comprising the material to be deposited, thereby positioning the distal portion 113 of the elongated aperture 104 in fluid communication with a liquid comprising the material. The material can be dissolved or suspended in the liquid. The liquid comprising the material can then be drawn into at least a portion of the elongated aperture 104 by a passive adsorption process. In some embodiments, the material can be positioned (e.g., in a dry state) on a surface (e.g., a microarray spot), and wetted temporarily to facilitate front-loading of the deposition apparatus 100. An example of front-loading is illustrated in FIG. 28 and is described below.

The term "back-loading" can refer to receiving the material to be deposited (e.g., a liquid comprising the material to be deposited) in the reservoir 106 and/or the elongated aperture 104 in a location upstream of the terminal end 114 of the elongated beam 102. For example, in some embodiments, the material can be loaded into or adjacent the proximal portion 111 of the elongated aperture 104. That is, material can be positioned in, or delivered to, the proximal portion 111 of the elongated aperture 104 or the reservoir 106 to which the proximal portion 111 of the elongated aperture 104 is fluidly connected. In some embodiments, material can be delivered to the reservoir 106 and/or the elongated aperture 104 with a pipette, a pin tool spotter, a piezo-jet, an acoustic lifter, and the like, or in any combination of such manners. Back-loading the deposition apparatus 100 can reduce the need to interrupt a deposition process in order to refill the deposition apparatus 100. For example, in some embodiments, a single loading of the deposition apparatus 100 can be used to produce at least about 3000 spots (e.g., 30 10×10 arrays), a deposition process that can take as long as an hour in some applications.

Whether front-loading and/or back-loading is employed, the deposition apparatus 100 is considered to be "loaded" when a substantial portion of the elongated aperture 104 and/or the reservoir 106 has been filled with material to be deposited. In addition, whether front-loading and/or back-loading is used to load the reservoir 106 and/or the elongated aperture 104, the deposition apparatus 100 can be loaded by a passive adsorption process involving control of one or more environmental parameters (e.g., humidity, temperature, pressure, etc., and particularly, control of the local environment surrounding the distal portion 109 of the elongated beam 102), selection of the material properties of at least a portion of the inner surface 108 and/or the outer surface 116 of the deposition apparatus 100 (e.g., hydrophobicity/hydrophilicity of the inner surface 108 and/or outer surface 116, relative properties of the inner surface 108 and the outer surface 116), selection of the material properties of the elongated beam 102 and/or the base 105 (e.g., stiffness of the elongated beam 102, force constant k of the elongated beam 102, stiffness of the base 105, etc.), geometry selection of the elongated beam 102, geometry selection of the elongated aperture 104, capillary action control, and combinations thereof.

With reference again to the embodiment of FIGS. 1-3, in some embodiments the distal portion 113 of the elongated beam 102 includes at least two arms 120 that are tapered toward the terminal end 114 of the elongated beam 102 to define a quill 122. In such embodiments, the spot size of material deposited from the deposition apparatus 100 can depend at least in part upon the angle between the sides of the arms 120 (i.e., the degree of taper of the distal portion 109 of the elongated beam 102) and the distance between the arms 120 (i.e., the width of the elongated aperture 104) at the terminal end 114 of the elongated beam 102.

In some embodiments, the elongated aperture 104 includes a first portion 110 that includes an upwardly-opening channel (i.e., having at least one open side, and other sides defined by surfaces of the elongated beam 102) having a depth d and a second portion 112 that includes a split in the elongated beam 102 extending through the thickness t of the elongated beam 102 (i.e., having a depth equal to t). In such embodiments, the elongated aperture 104 can direct material from the first portion 110 having an inner surface 108 defined by a number of sides (e.g., three sides in the illustrated embodiment of FIGS. 1-3), to the second portion 112 having an inner surface 108 defined by fewer sides (e.g., two sides in the illustrated embodiment of FIGS. 1-3).

In operation, material to be deposited can be delivered to the quill 122 via capillary action (e.g., by controlling one or more environmental parameters, selection of material properties of one or more of the inner surface 108, the outer surface 116, the elongated beam 102, and the base 105, and the like). The elongated aperture depth d and width b (i.e., along the first portion 110 and/or the second portion 112), the shape of the distal portion 109 of the elongated beam, and the degree of taper (if any) of the elongated beam 102 can be selected to enhance deposition of any desired material. Spot shape and size of the deposited material can be at least partially dependent upon these parameters.

The elongated beam 102 can have any orientation with respect to the surface 101 upon which material is to be deposited. In some embodiments, this orientation can be determined at least in part by the orientation of the elongated beam 102 with respect to the base 105. In some embodiments, the elongated beam 102 can be oriented at an acute angle α with respect to the surface 101. In some embodiments, the elongated beam 102 can be oriented at an angle α of less than 45 degrees with respect to the surface 101. For example, the elongated beam 102 can be oriented at about 12 degrees with respect to the surface 101.

The force constant k of the elongated beam 102 can impact the quality of deposition apparatus operation. If the force constant k is too large, the probability of scratching the surface 101 during deposition becomes too great. Conversely, if the force constant k is too low, the elongated beam 102 can stick to the surface 101 by electrostatic or capillary forces. In some embodiments, the force constant k of the elongated beam 102 ranges from about 0.03 N/m to about 0.3 N/m. Alternatively, in some embodiments, the force constant k of the elongated beam 102 ranges from about 0.1 N/m to about 1 N/m. The force constant k of the cantilevered elongated beam 102 with Young's Modulus E, length l, width w, and thickness t can be calculated as follows:

$$k = \frac{Ewt^3}{4l^3}$$

The thickness t and length l of the elongated beam 102 can therefore be manipulated to achieve a desired force constant k. To achieve a desired force constant k in some embodiments, the elongated beam 102 is dimensioned to be relatively long (based on the above relationship). However, as the length l of the elongated beam 102 increases, the fluid transportation distance (e.g., the length l' of the elongated aperture 104) increases. Increasing the fluid transportation distance can result in increased chances of blockage or other forms of restriction causing reduced fluid flow along the elongated aperture 104. As a result, the geometry of the elongated beam 102 can be optimized for a given material to achieve a desired force constant k.

In light of the dimensional relationships of the elongated beam 102 and elongated aperture 104 described above, some embodiments of the present invention employ an elongated beam 102 having a length l no greater than about 2 mm. In some embodiments, the length l of the elongated beam 102 ranges from about 100 nm to about 1 mm. Also, in some embodiments, an elongated beam length l from about 200 microns to about 300 microns provides good performance results. In other embodiments, an elongated beam length l from about 50 microns to about 200 microns provides good performance results.

In some embodiments of the present invention, the width w of the elongated beam 102 ranges from about 20 microns to about 40 microns. Also, in some embodiments the thickness t of the elongated beam 102 is less than about 10 microns (for example, from about 2 microns to about 3 microns).

In some embodiments, the width b of the elongated aperture 104 ranges from about 1 micron to about 10 microns. With continued reference to the embodiment of FIGS. 1-3, in some embodiments, at least a portion of the elongated aperture 104 tapers in width b. For example, the second portion 112 of the elongated aperture 104 (e.g., a split) illustrated in FIGS. 1-3 can have a width b that tapers from about 10 microns adjacent a distal portion of the first aperture portion 110 to about 1 micron adjacent the terminal end 114 of the elongated beam 102. In the illustrated embodiment of FIGS. 1-3, the length a of the second portion 112 is about 40 microns, although longer or shorter lengths a can be employed as desired. Also in the embodiment illustrated in FIGS. 1-3, the length a of the second portion 112 is about equal to the length f of the tapered portion of the elongated beam 102 (i.e., the distance between where the elongated beam 102 begins to taper and the terminal end 114 of the elongated beam 102). However, this need not necessarily be the case, since the second portion 112 of the elongated aperture 104 (i.e., that portion of the elongated aperture 104 having a depth equal to the thickness t of the elongated beam 102) can extend along any portion of the elongated aperture 104, and need not correspond to any tapered portion of the elongated beam 102. Reference is made, for example, to the deposition apparatus 200 illustrated in FIGS. 4-5 and described below.

In some embodiments, the reservoir 106 includes a depth D of about 10 microns, although deeper or shallower depths D can be used as desired. In some embodiments, the depth D of the reservoir 106 is constant across substantially the entire area of the reservoir 106. However, in other embodiments, the depth D of the reservoir 106 is variable at different positions in the reservoir 106. In some embodiments, the depth d of the elongated aperture 104 is about 1 micron, and can be substantially constant along the length l' of the elongated aperture 104 or can be variable along any part or all of this length l'.

In some embodiments, the tip of each of the arms 120 is rounded. For example, the radius of curvature of the arm tips illustrated in FIGS. 1-3 is about 1 micron, although other radii of curvature can be employed in alternative embodiments.

A number of dimensions of the deposition apparatus 100 are described herein with reference to the illustrated embodiments as well as other embodiments. However, it should be noted that the dimensions are presented as providing good performance results compared to other possible dimensions, and are presented by way of example only. It should also be noted that a variety of different dimensions and ranges of dimensions can be used to achieve a desired force constant k of the elongated beam 102 in order to produce a desired drop volume of material (e.g., about a picoliter, a femtoliter, or an attoliter) and a desired spot size.

Deposition performance can often be improved by varying one or more of the following parameters: dimensions of the elongated aperture 104 (including dimensions of the second portion 112 of the elongated aperture 104), material properties of the elongated beam 102 (e.g., spring constant, Young's modulus, hardness, toughness, yield strength, etc.), the length l of the elongated beam 102, and the shape of the elongated beam 102, among other parameters.

In some embodiments, at least a portion (e.g., the elongated beam 102) or all of the deposition apparatus 100 is manufactured by standard microfabrication methods, including photolithography, UV photolithography, chemical etching, plasma etching, electron beam lithography, phase-shift masking, and/or other methods known to those skilled in the art.

The materials used for the deposition apparatus 100 can include, for example, silicon (Si), silicon nitride ($Si_3Ni_4$), and silicon dioxide ($SiO_2$). Silicon has a Young's Modulus E of about 190 GPa, silicon dioxide has a Young's Modulus E of about 70 GPa, and silicon nitride has a Young's Modulus E of about 385 GPa.

Although other materials are possible as just described, in some embodiments, at least a portion or all of the deposition apparatus 100 comprises silicon dioxide (e.g., thermally grown silicon dioxide) based upon its relatively low Young's Modulus (which can reduce the length l of the elongated beam 102 necessary to achieve a desired force constant k) and the low internal stresses of thermally grown silicon dioxide. Low internal stresses and minimal stress gradients in the elongated beam 102 can enhance the production of a substantially flat elongated beam 102 with minimal to no warpage or bending. In addition, silicon dioxide is biocompatible and highly hydrophilic. Employing a highly hydrophilic material for construction of part or all of the deposition apparatus 100 can facilitate loading of the elongated aperture 104 and deposition of material. In addition, silicon dioxide is substantially transparent to visible light, enhancing its ability for in situ sample loading control through optical visualization. Furthermore, using silicon dioxide can facilitate control of the thickness t of the elongated beam 102 during a final releasing process (during fabrication by KOH etching) because a critical time thickness control or boron doping is not necessarily required in such a process.

Other deposition apparatus materials can be used instead of or in addition to those listed above, including without limitation plastics, metals, piezo ceramics, composites, nanotubes, nanowires, biomaterials, elastomers, glass, or any other suitable material, and combinations thereof. In some embodiments, the material used is selected to have an appropriate stiffness, malleability and compatibility with subsequent modification processes, including the addition of specific material having chemical or biological properties to enhance deposition performance. Any suitable construction technique for the materials mentioned above can be employed in the creation of the deposition apparatus 100 according to the present invention.

Similar to the manner in which material is loaded onto the deposition apparatus 100, material can be deposited by a passive adsorption process involving control of one or more environmental parameters (e.g., humidity, temperature, pressure, etc., and particularly, control of the local environment surrounding the distal portion 109 of the elongated beam 102), selection of the material properties of at least a portion of the inner surface 108 and/or the outer surface 116 of the deposition apparatus 100 (e.g., hydrophobicity/hydrophilicity of the inner surface 108 and/or outer surface 116, relative properties of the inner surface 108 and the outer surface 116), selection of the material properties of the elongated beam 102 and/or the base 105 (e.g., stiffness of the elongated beam 102, force constant k of the elongated beam 102, stiffness of the base 105, etc.), geometry selection of the elongated beam 102, geometry selection of the elongated aperture 104, capillary action control, and combinations thereof. Such control can provide advantages over conventional deposition devices that move the material along a channel using power (e.g., in the form of electromotive force, electroosmotic force, etc.) supplied to the apparatus or that move material to be deposited in other manners.

In some embodiments, depositing material onto a surface can comprise bringing the substantially planar elongated beam 102 into contact with the surface 101 (i.e., "contact printing" or "contact deposition"), or bringing the substantially planar elongated beam 102 near the surface 101 (i.e., "non-contact printing" or "non-contact deposition"). By controlling the humidity, temperature, pressure and/or other environmental parameters of the local environment, deposition and spot size of the material can be controlled. In some embodiments, the terminal end 114 of the elongated beam 102 can be shaped to define a relatively sharp point adjacent the surface 101, thus defining a relatively small area of the terminal end 114 in contact or near contact with the surface 101 to dispense a drop of material onto the surface 101. In some embodiments of the present invention employed in a non-contact printing or deposition system, as a drop of material is about to be dispensed or is in the process of being from the terminal end 114 of the elongated beam 102, a conventional force feedback mechanism (described in greater detail below) coupled to the deposition apparatus 100 can stop motion of the elongated beam 102. In such embodiments, the drop of material can be dispensed onto the surface 101 without the terminal end 114 ever making direct contact with the surface 101.

The deposition apparatus 100 according to the present invention can be utilized in systems that oscillate the elongated beam 102 (or other deposition hardware to which the elongated beam 102 is coupled) to facilitate delivery of material from the elongated beam 102 to the surface 101. Oscillation of the elongated beam 102 can be used in contact and non-contact deposition methods. For example, in some embodiments, the elongated beam 102 can contact the surface 101 onto which material is to be deposited. In such cases, the elongated beam 102 can contact the surface one time, or can be oscillated (e.g., at the resonant frequency of the elongated beam 102 or another frequency) to contact the surface 101 multiple times in order to deposit the material onto the surface 101.

In some embodiments, it can be useful to be able to sense contact between a portion of the deposition apparatus 100 (e.g., the elongated beam 102) and the surface 101, or between the material about to be deposited (as described above) and the surface 101. This ability can reduce sliding of the elongated beam 102 along the surface 101, which can reduce the potential for damaging the surface 101 and/or the elongated beam 102. Such damage can compromise deposition performance, including spot size and reproducibility. Therefore, some embodiments of the present invention include a force sensing capability. One method for accomplishing force sensing is through the use of a conventional "optical lever" system. In this system, a laser is reflected from the back of the deposition apparatus 100 onto a split photodetector. Such a system is substantially robust, and can be modified for a variety of embodiments of the present invention. However, alternative methods such as integrated piezoresistive elements can also be used. Although force feedback devices and systems can make an individual deposition apparatus 100 more complex than a simple elongated beam 102, the end product can be a relatively simple force sensing system that does not require the manual adjustments often needed for optical sensing systems. As a result, the deposition apparatus 100 can employ piezoresistive elements, strain gauges, capacitance devices, or similar devices or methods for detection of contact with the surface 101 (i.e., between the deposition apparatus 100 and the surface 101 or between the material and the surface 101).

In some embodiments, at least a portion of the deposition apparatus 100 according to the present invention is exchangeable and/or disposable. For example, in some embodiments, at least a portion of the deposition apparatus 100 is exchangeable and/or disposable in a manner similar to the manner in which a multi-color printer cartridge can be exchanged and/or disposed in a printing device. In some embodiments, the entire deposition apparatus 100 is exchangeable and/or disposable. In other embodiments, the elongated beam 102 is exchangeable and/or disposable, and the base 105 is substantially permanent. In either case, the deposition apparatus 100 can be adapted to deposit a variety of different materials onto a surface 101.

Figure 4:
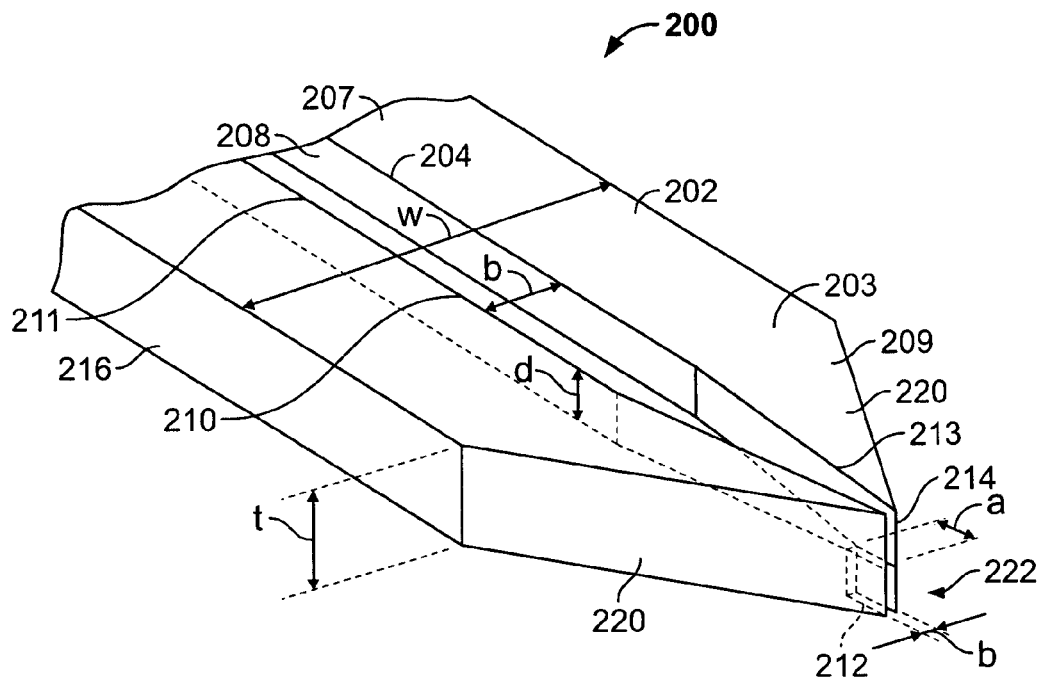
FIG. 4 is a detail perspective view of a deposition apparatus according to another embodiment of the present invention.
Figure 5:
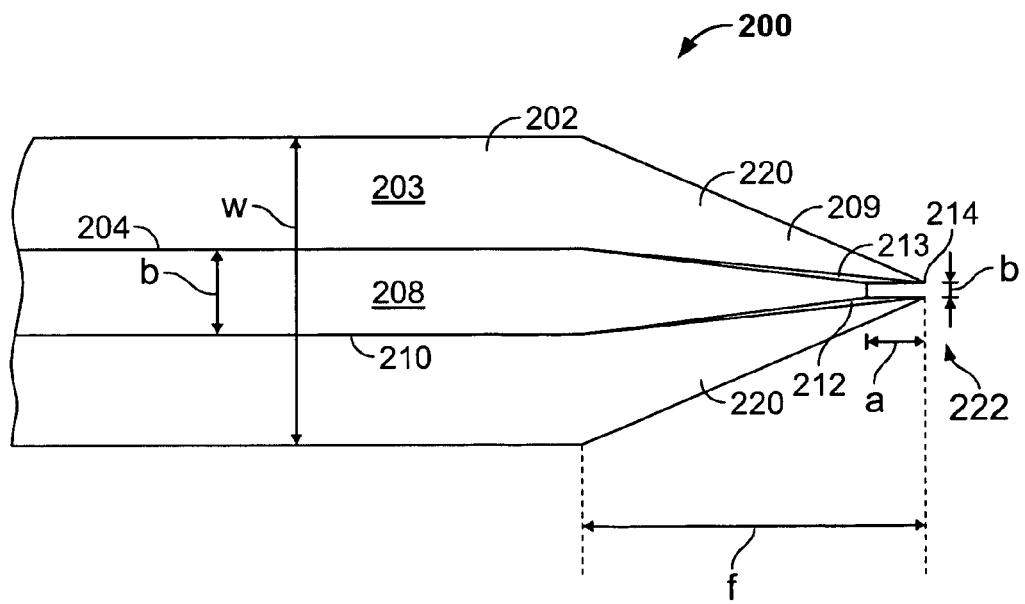
FIG. 5 is a top view of the deposition apparatus of FIG. 4.

FIGS. 4 and 5 illustrate another deposition apparatus 200 according to the present invention, wherein like numerals represent like elements. The deposition apparatus 200 illustrated in FIGS. 4 and 5 shares many of the same elements and features described above with reference to the illustrated embodiment of FIGS. 1-3. Accordingly, elements and features corresponding to elements and features in the illustrated embodiment of FIGS. 1-3 are provided with the same reference numerals in the 200 series. Reference is made to the description above accompanying FIGS. 1-3 for a more complete description of the features and elements (and alternatives to such features and elements) of the embodiment illustrated in FIGS. 4-5.

The deposition apparatus 200 illustrated in FIGS. 4 and 5 includes a substantially flat elongated beam 202 having an elongated aperture 204 defined in an upper surface 203 of the elongated beam 202. The elongated aperture 204 defines an inner surface 208. The elongated beam 202 and the elongated aperture 204 can each include a proximal portion (not shown) and a distal portion 209, 213, respectively. FIGS. 4 and 5 show the distal portions 209 and 213 of the elongated beam 202 and the elongated aperture 204, respectively, in detail. As shown in FIGS. 4 and 5, the elongated aperture 204 can include a first portion 210 with a depth d and a second portion 212 that extends through the thickness t of the elongated beam 102, such that the depth of the second portion 212 is substantially equal to the thickness t. As a result, the portion of the inner surface 208 that defines the first portion 210 of the elongated aperture 204 can be defined by a number of sides (e.g., three sides in the illustrated embodiment of FIGS. 4 and 5), and the portion of the inner surface 208 that defines the second portion 212 of the elongated aperture 204 can be defined by fewer sides (e.g., two sides in the illustrated embodiment of FIGS. 4 and 5).

Similar to the embodiment illustrated in FIGS. 1-3, the distal portion 209 of the elongated beam 202 can include at least two arms 220 that are tapered toward a terminal end 214 of the elongated beam 202 to define a quill 222. As shown in FIGS. 4 and 5, the length a of the second portion 212 of the elongated aperture 104 can be less than the length f of the tapered portion of the distal portion 209 of the elongated beam 202. In some embodiments, the length a of the second portion 212 ranges from about 0.2 microns to about 10 microns. For example, in some embodiments, the length a of the second portion 212 ranges from about 5 microns to about 7 microns.

As best shown in FIG. 5, the width b of the elongated aperture 204 begins tapering at the position where the elongated beam 202 begins tapering (i.e., a distance spaced a length f from the terminal end 214 of the elongated beam 202). However, in some embodiments the width b of the elongated aperture 204 can stop tapering and can become substantially constant at the junction between the first portion 210 and the second portion 212 of the elongated aperture 204. That is, the width b of the elongated aperture 204 corresponding to the second portion 212 of the elongated aperture 204 can be substantially constant. In some embodiments, the width b of the second portion 212 of the elongated aperture 204 ranges from about 0.2 microns to about 100 microns.

Also, in some embodiments, the width b of the second portion 212 of the elongated aperture 204 ranges from about 1 micron to about 50 microns. Furthermore, in some embodiments, the width b of the second portion 212 of the elongated aperture 204 ranges from about 1 micron to about 3 microns. Thus, in the illustrated embodiment of FIGS. 4 and 5, the width b of the elongated aperture 204 is substantially constant along a proximal portion of first portion 210 of the elongated aperture 204, is gradually reduced along the distal portion of the first portion 210 of the elongated aperture 204, and is substantially constant again along the length a of the second portion 212 of the elongated aperture 204.

Figure 6:
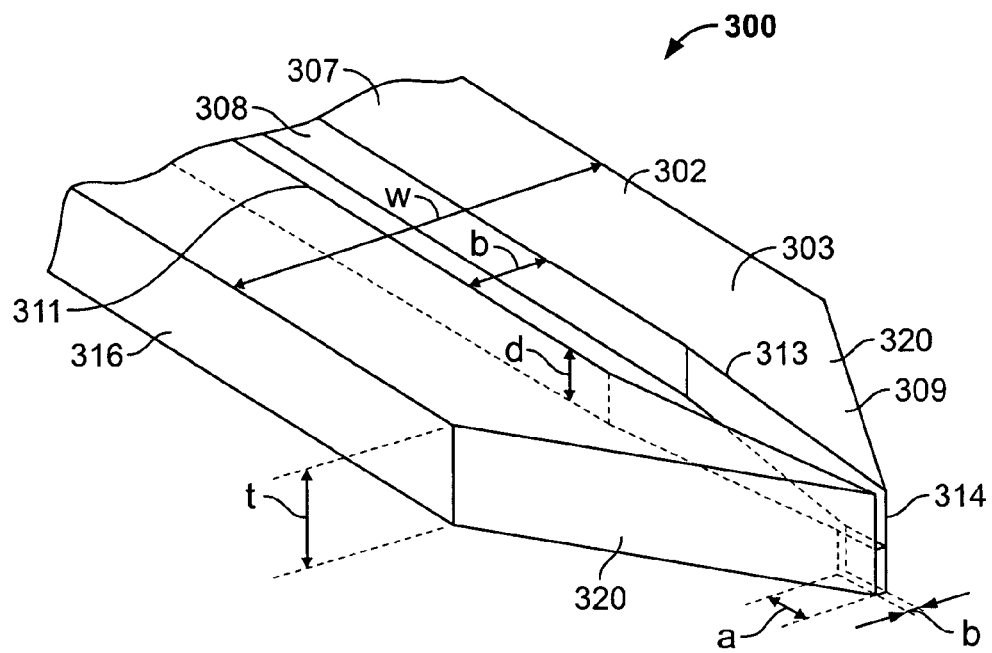
FIG. 6 is a detail perspective view of a deposition apparatus according to another embodiment of the present invention.
Figure 7:
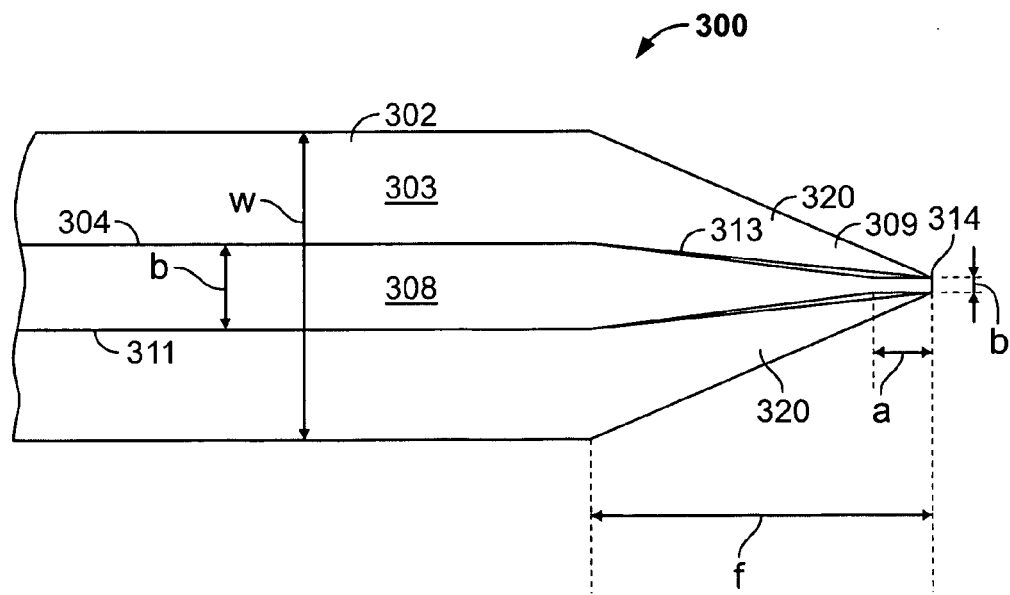
FIG. 7 is a top view of the deposition apparatus of FIG. 6.

FIGS. 6 and 7 illustrate another deposition apparatus 300 according to the present invention, wherein like numerals represent like elements. The deposition apparatus 300 shares many of the same elements and features described above with reference to the illustrated embodiment of FIGS. 1-3. Accordingly, elements and features corresponding to elements and features in the illustrated embodiment of FIGS. 1-3 are provided with the same reference numerals in the 300 series. Reference is made to the description above accompanying FIGS. 1-3 for a more complete description of the features and elements (and alternatives to such features and elements) of the embodiment illustrated in FIGS. 6 and 7.

As shown in FIGS. 6 and 7, the illustrated deposition apparatus 300 is similar to the deposition apparatus 200 shown in FIGS. 4-5, with the exception that the elongated aperture 304 of the deposition apparatus 300 does not include a second portion. That is, the elongated aperture 304 has a depth d along the length of the elongated aperture 304, and substantially no portion of the elongated aperture 304 extends through the thickness t of the elongated beam 302. As a result, the arms 320 of the deposition apparatus 300 are only partial arms, as they are never completely separated from one another, but are instead joined by a bottom portion of the elongated beam 302.

With continued reference to FIGS. 6 and 7, the width b of the elongated aperture 304 can be substantially constant along a proximal portion of the elongated aperture 304, can then be gradually reduced from a location along the elongated beam 302 proximate the location at which the elongated beam 302 begins to taper (i.e., a length f from the terminal end 314 of the elongated beam 302), and can be substantially constant again along the length a (i.e., between a location positioned the length a from the terminal end 314 to the terminal end 314). Also, the same size ranges of the width b and the length a described above with regard to the embodiment of FIGS. 5 and 6 can be used with the deposition apparatus illustrated in FIGS. 6 and 7.

In some embodiments, the width b of the deposition apparatus 300 does not become substantially constant again along the length a of the elongated aperture 304, but instead continues to taper along the length or substantially the entire length f (i.e., from a location where the elongated beam 302 begins to taper to the terminal end 314 of the elongated beam 302).

Also with reference to the illustrated embodiment of FIGS. 6 and 7, the terminal end 314 of the elongated beam 302 can be substantially blunt, such that the portion of the elongated beam 302 that defines the elongated aperture 304 terminates at the same position along the elongated beam 302 at which the arms 320 terminate, and such that the inner surface 308 defining the elongated aperture 304 is formed by the same sides of the elongated beam (e.g., three sides of the elongated beam 302 in the embodiment of FIGS. 6 and 7) along the length or substantially the entire length of the elongated aperture 304.

Figure 8:
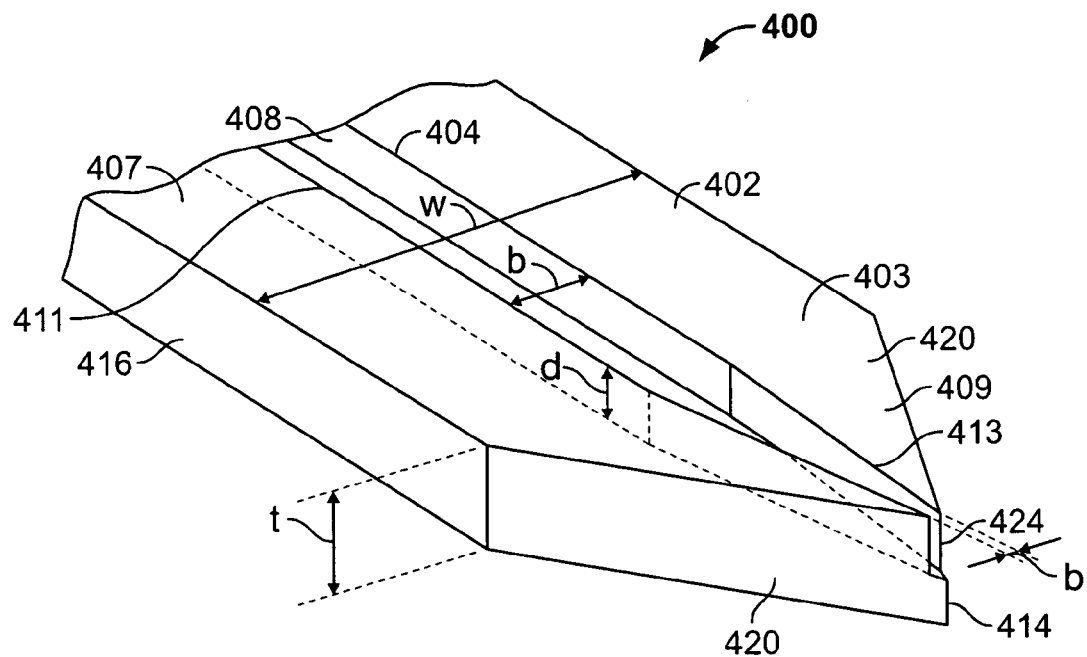
FIG. 8 is a detail perspective view of a deposition apparatus according to another embodiment of the present invention.
Figure 9:
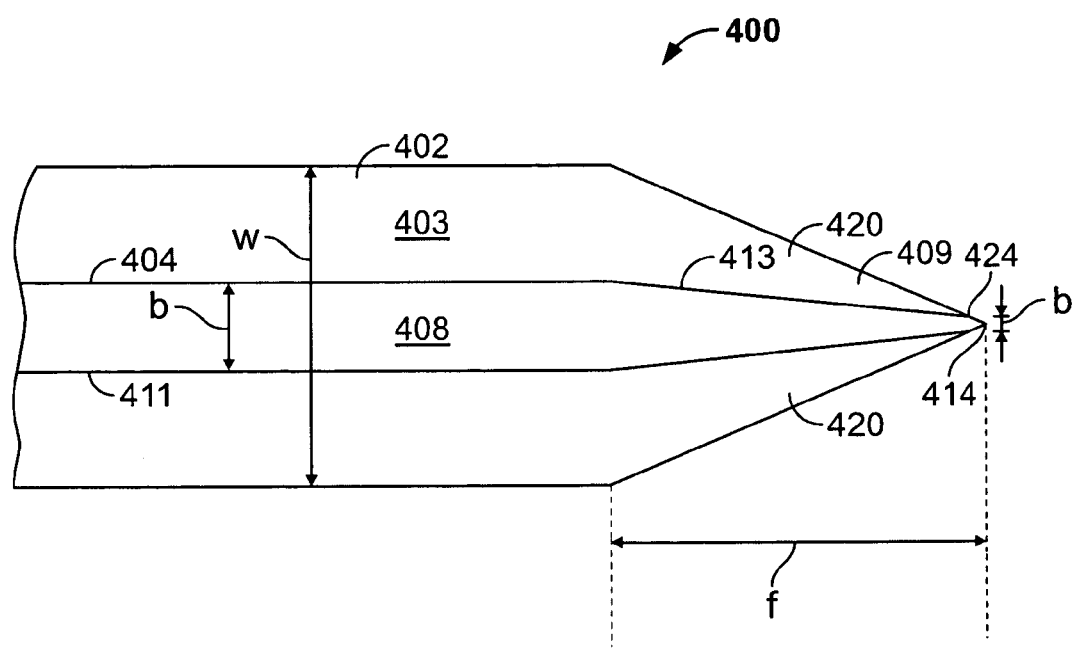
FIG. 9 is a top view of the deposition apparatus of FIG. 8.

FIGS. 8 and 9 illustrate another deposition apparatus 400 according to the present invention, wherein like numerals represent like elements. The deposition apparatus 400 shares many of the same elements and features described above with reference to the illustrated embodiment of FIGS. 1-3. Accordingly, elements and features corresponding to elements and features in the illustrated embodiment of FIGS. 1-3 are provided with the same reference numerals in the 400 series. Reference is made to the description above accompanying FIGS. 1-3 for a more complete description of the features and elements (and alternatives to such features and elements) of the embodiment illustrated in FIGS. 8 and 9.

Similar to the deposition apparatus 300 illustrated in FIGS. 6 and 7, the deposition apparatus 400 illustrated in FIGS. 8 and 9 does not include a second portion similar to the second portion 212 illustrated in FIGS. 4 and 5. That is, the elongated aperture 404 has a depth d along the length of the elongated aperture 404, and no portion of the elongated aperture 404 extends through the thickness t of the elongated beam 402. The elongated aperture 404 can have a substantially constant width b along a portion of the length of the elongated aperture 404, and can begin to taper at a location along the elongated beam 402 where the elongated beam 402 begins to taper (i.e., at a located positioned a length f from the terminal end 414 of the elongated beam 302). The elongated aperture 404 can then continue to taper to a terminal end 424 of the elongated aperture 404.

Unlike the deposition apparatuses 100, 200 and 300 described above, the terminal end 424 of the elongated aperture 404 in the deposition apparatus 400 illustrated in FIGS. 8 and 9 is not coincident with the terminal end 414 of the elongated beam 402. That is, the terminal end 414 of the elongated beam 402 is disposed a distance distally from the terminal end 424 of the elongated aperture 404. In other words, a portion of the terminal end 414 of the elongated beam 402 extends beyond the terminal end 424 of the elongated aperture 404, and is in fluid communication with the elongated aperture 404. In some embodiments, the portion of the terminal end 414 extending beyond the terminal end 424 of the elongated aperture 404 can be pointed (see FIGS. 8 and 9, for example). Particularly in such embodiments, the size of the portion of the terminal end 414 extending beyond the terminal end 424 of the elongated aperture 404 can be at least partially determined by the width b of the elongated aperture 404, and the angle (e.g., sharpness) of the terminal end 414 of the elongated beam 402.

Figure 10:
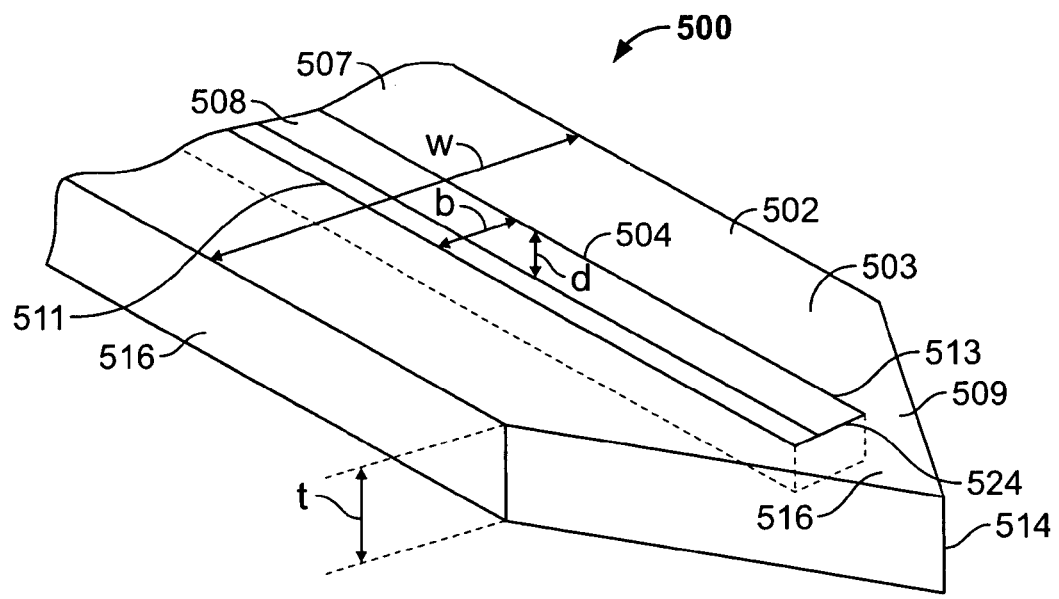
FIG. 10 is a detail perspective view of a deposition apparatus according to another embodiment of the present invention.
Figure 11:
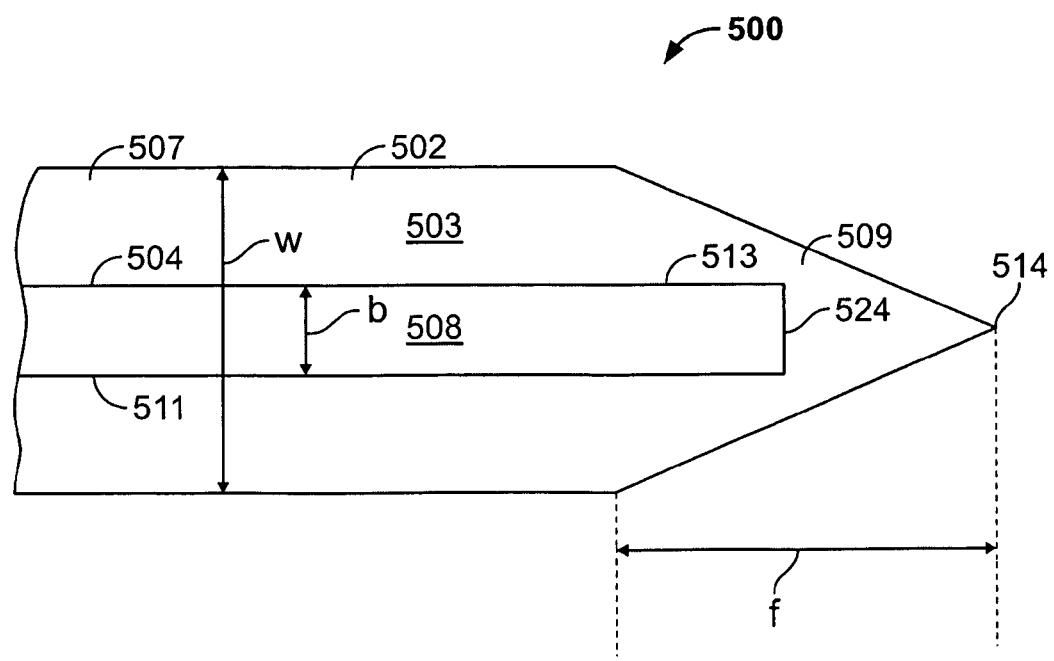
FIG. 11 is a top view of the deposition apparatus of FIG. 10.

FIGS. 10 and 11 illustrate another deposition apparatus 500 according to the present invention, wherein like numerals represent like elements. The deposition apparatus 500 shares many of the same elements and features described above with reference to the illustrated embodiment of FIGS. 1-3. Accordingly, elements and features corresponding to elements and features in the illustrated embodiment of FIGS. 1-3 are provided with the same reference numerals in the 500 series. Reference is made to the description above accompanying FIGS. 1-3 for a more complete description of the features and elements (and alternatives to such features and elements) of the embodiment illustrated in FIGS. 10 and 11.

With reference to FIGS. 10 and 11, the elongated aperture 504 of the deposition apparatus 500 can include a terminal end 524 disposed a distance from the terminal end 514 of the elongated beam 502. In such embodiments, capillary flow, environment control (e.g., humidity, temperature, pressure, etc.), selection of material properties of the inner surface of the elongated aperture 504 (e.g., hydrophobicity/hydrophilicity of the inner surface of the elongated aperture 504), and combinations thereof can be used to control movement of material along the elongated aperture 504. In this regard, the material can move in a direction toward the terminal end 524 of the elongated aperture 504, and from the terminal end 524 of the elongated aperture 504 to the terminal end 524 of the elongated beam 502. Furthermore, environment control and/or selection of material properties of the elongated beam 502 near the terminal end 514 (e.g., hydrophobicity/hydrophilicity of the outer surface 516 of the elongated beam 502) can control deposition of the material.

Also with reference to FIGS. 10 and 11, the width b of the elongated aperture 504 in the deposition apparatus 500 can be substantially constant along the length of the elongated aperture 504 to the terminal end 524 of the elongated aperture 504. In addition, the depth d of the elongated aperture 504 can be substantially constant along the length of the elongated aperture 504. Furthermore, the elongated aperture 504 need not have a second portion similar to the second portion 212 described above with reference to FIGS. 4 and 5. That is, the elongated aperture 504 can have a depth d along the length of the elongated aperture 504, wherein no portion (or substantially no portion) of the elongated aperture 504 extends through the thickness t of the elongated beam 502. Also, the elongated beam 504 can include a tapered distal portion 509, similar to that of the other deposition apparatuses 100, 200, 300 and 400 described above.

Figure 12:
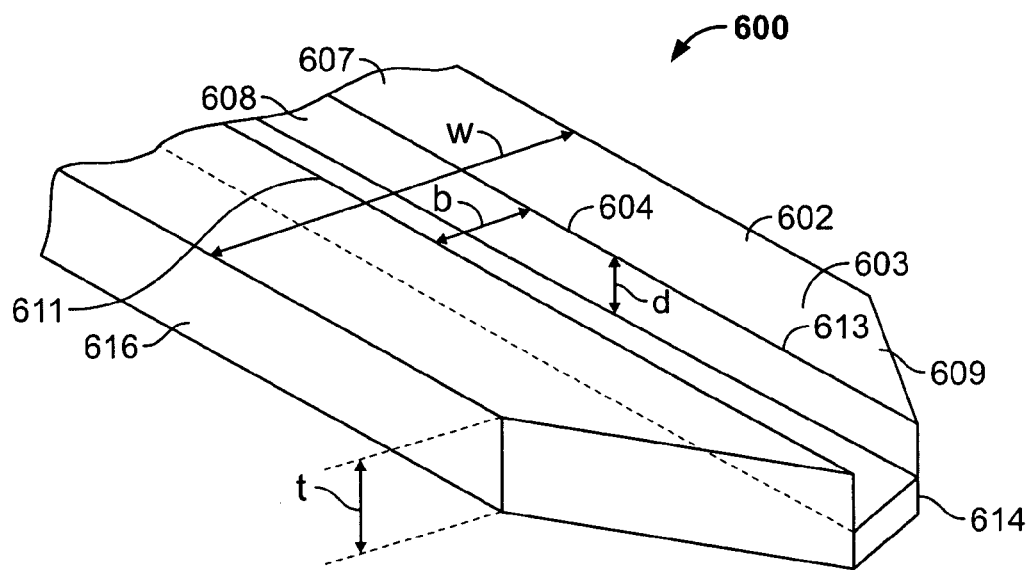
FIG. 12 is a detail perspective view of a deposition apparatus according to another embodiment of the present invention.
Figure 13:
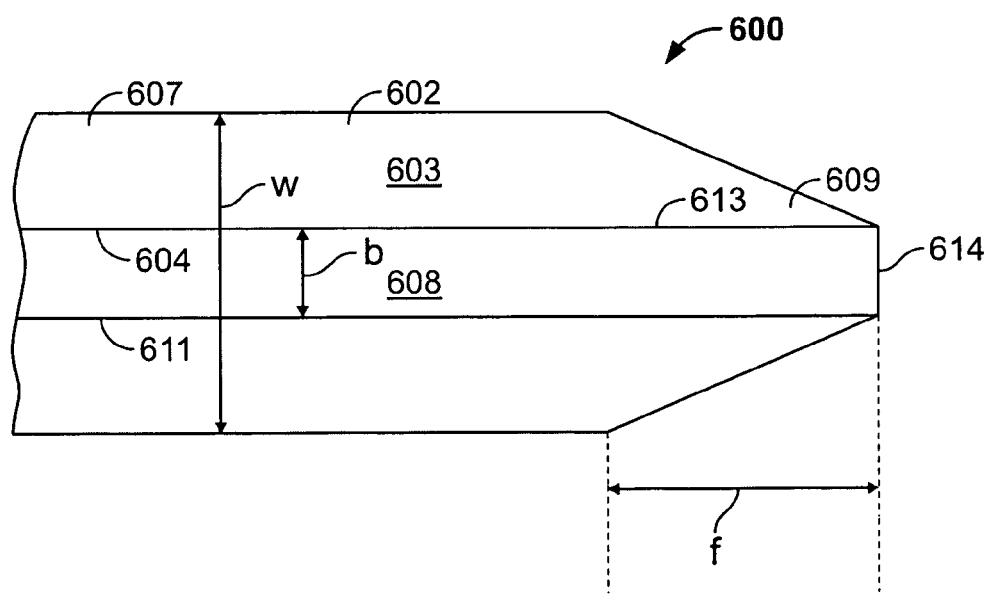
FIG. 13 is a top view of the deposition apparatus of FIG. 12.

FIGS. 12 and 13 illustrate another deposition apparatus 600 according to the present invention, wherein like numerals represent like elements. The deposition apparatus 600 shares many of the same elements and features described above with reference to the illustrated embodiment of FIGS. 1-3. Accordingly, elements and features corresponding to elements and features in the illustrated embodiment of FIGS. 1-3 are provided with the same reference numerals in the 600 series. Reference is made to the description above accompanying FIGS. 1-3 for a more complete description of the features and elements (and alternatives to such features and elements) of the embodiment illustrated in FIGS. 12-13.

With reference to FIGS. 12 and 13, the illustrated deposition apparatus 600 can have an elongated beam 602 with a substantially blunt terminal end 614. In addition, the elongated aperture 604 can extend through the terminal end 614 of the elongated beam 602. In some embodiments having either or both of these features, the width b of the elongated aperture 604 can be substantially constant along the length of the elongated aperture 604, and the depth d can be substantially constant along the length of the elongated aperture 604 (although non-constant widths b and depths d are possible in alternative embodiments). As a result, the elongated aperture 604 in the illustrated embodiment of FIGS. 12 and 13 does not include a second portion similar to the second portion 212 described above with reference to FIGS. 4 and 5. That is, in some embodiments, no portion or substantially no portion of the elongated aperture 604 extends through the thickness t of the elongated beam 602.

Figure 14:
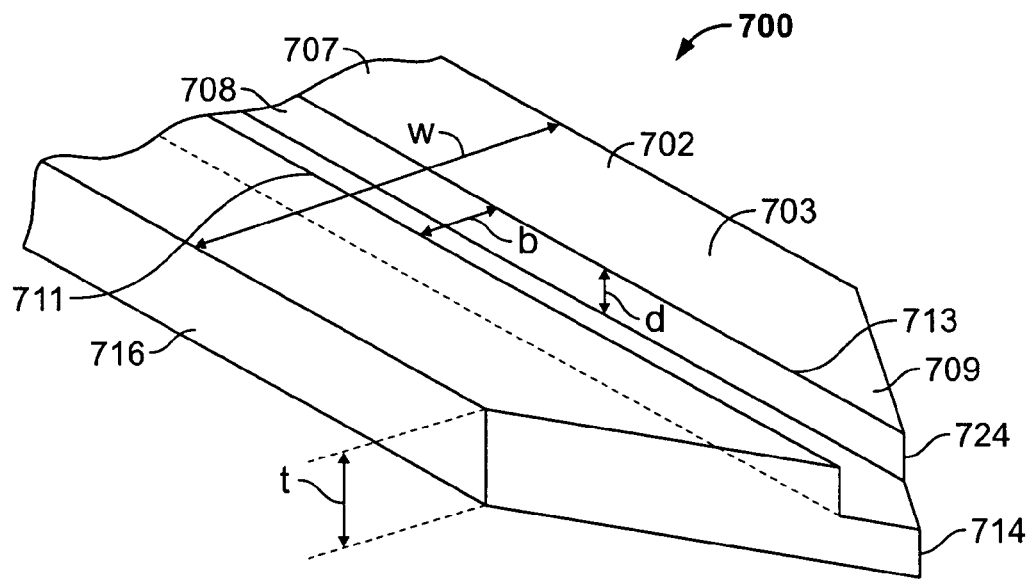
FIG. 14 is a detail perspective view of a deposition apparatus according to another embodiment of the present invention.
Figure 15:
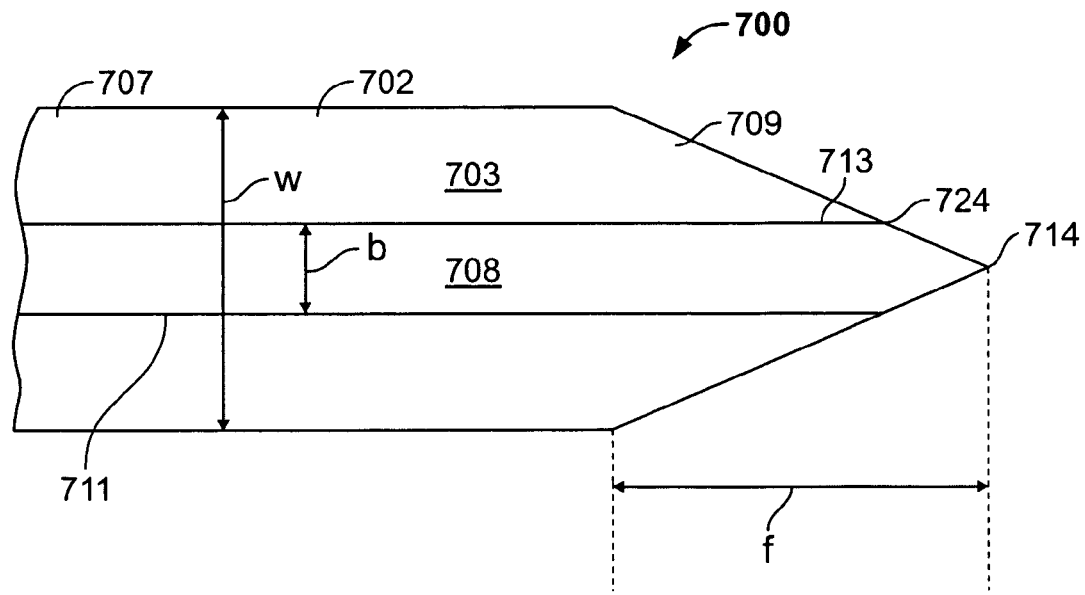
FIG. 15 is a top view of the deposition apparatus of FIG. 14.

FIGS. 14 and 15 illustrate another deposition apparatus 700 according to the present invention, wherein like numerals represent like elements. The deposition apparatus 700 shares many of the same elements and features described above with reference to the illustrated embodiment of FIGS. 1-3. Accordingly, elements and features corresponding to elements and features in the illustrated embodiment of FIGS. 1-3 are provided with the same reference numerals in the 700 series. Reference is made to the description above accompanying FIGS. 1-3 for a more complete description of the features and elements (and alternatives to such features and elements) of the embodiment illustrated in FIGS. 14 and 15.

With reference to FIGS. 14 and 15, the deposition apparatus 700 can have an elongated aperture 704 with a terminal end 724 disposed a distance proximally from and in fluid communication with the terminal end 714 of the elongated beam 702. In some embodiments, the distal portion 709 of the elongated beam 702 is tapered. In such embodiments, the distal portion 709 can be pointed (see FIGS. 14 and 15) or blunted. In some embodiments, the size of the portion of the terminal end 714 extending beyond the terminal end 724 of the elongated aperture 704 can be at least partially determined by the width b of the elongated aperture 704 and the angle (e.g., sharpness) of the terminal end 714 of the elongated beam 702.

As shown in FIGS. 14 and 15, the width b of the elongated aperture 704 can be substantially constant along the length of the elongated aperture 704, and the depth d can be substantially constant along the length of the elongated aperture 704 (although non-constant widths b and depths d are possible in alternative embodiments). As a result, the elongated aperture 704 does not include a second portion similar to the second portion 212 described above with reference to FIGS. 4 and 5. That is, no portion or substantially no portion of the elongated aperture 704 extends through the thickness t of the elongated beam 702.

Figure 18:
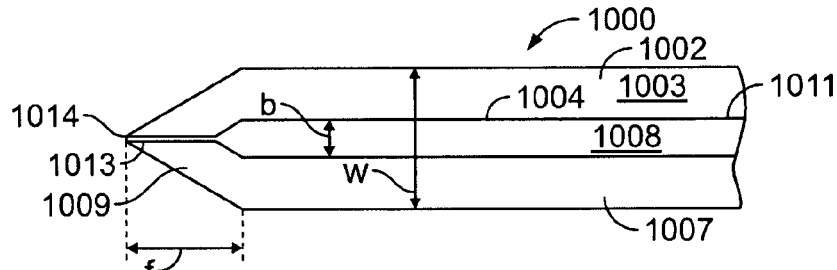
Figure 19:
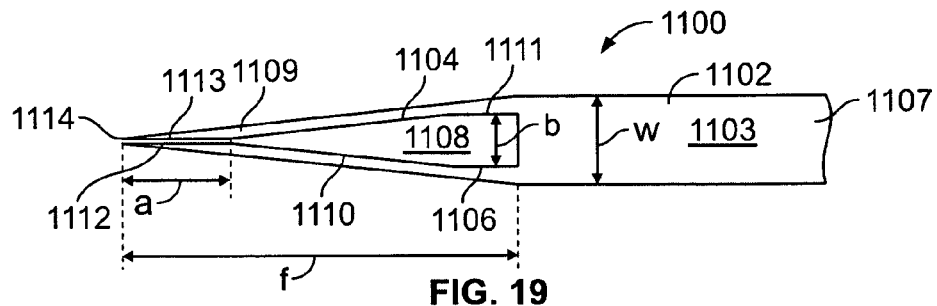
Figure 20:
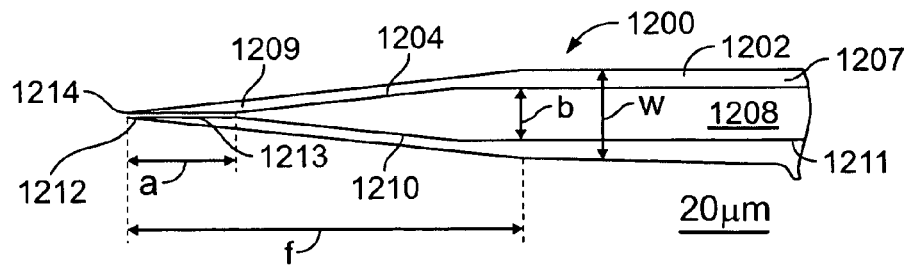

FIGS. 16-20 illustrate still other deposition apparatuses 800, 900, 1000, 1100, 1200, respectively, according to the present invention, wherein like numerals represent like elements. The deposition apparatuses 800, 900, 1000, 1100, 1200 share many of the same elements and features described above with reference to the illustrated embodiment of FIGS. 1-3. Accordingly, elements and features corresponding to elements and features in the illustrated embodiment of FIGS. 1-3 are provided with the same reference numerals in the 800, 900, 1000, 1100, and 1200 series. Reference is made to the description above accompanying FIGS. 1-3 for a more complete description of the features and elements (and alternatives to such features and elements) of the embodiments illustrated in FIGS. 16-20. A scale marker showing 20 microns ("20 µm") is shown in FIG. 20, and applies to all of FIGS. 16-20.

Figure 16:
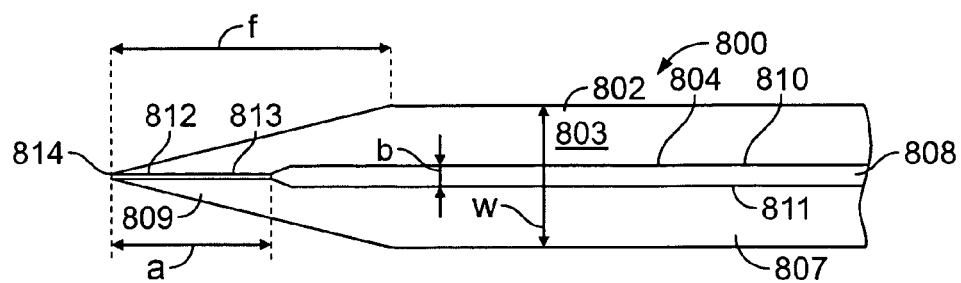
FIGS. 16-20 are top views of deposition apparatuses according to further embodiments of the present invention.

The deposition apparatus 800 shown in FIG. 16 includes an elongated aperture 804 having first and second portions 810, 812 similar to the first and second portions 110, 112 described above in connection with the embodiments of FIGS. 1-5. In some embodiments, the first portion 810 has a depth d, and the second portion 812 extends through the thickness of the elongated beam 802 such that the depth of the second portion 812 is equal or substantially equal to the thickness of the elongated beam 802. The second portion 812 of the elongated aperture 804 can have a substantially constant width b along the length a or substantially the entire length a of the second portion 812. Similarly, the first portion 810 of the elongated aperture 804 can have a substantially constant width b along the length or substantially the entire length of the first portion 810, and in some embodiments can taper along a portion of length of the first portion 810 to the junction between the first portion 810 and the second portion 812.

With continued reference to FIG. 16, in some embodiments the distal portion 809 of the elongated beam 802 is tapered. The location along the length of the elongated aperture 804 at which the width b of the elongated aperture 804 begins to taper need not be coincident with the location along the length of the elongated beam 802 at which the elongated beam 802 begins to taper (although this can be the case in alternative embodiments). Also, in those embodiments in which the first and second portions 810, 812 are joined by a tapered portion of the elongated aperture 804 as described above, the degree of taper of the elongated aperture 804 can be the same or different (see FIG. 16) as the degree of taper of the elongated beam 802. In the illustrated embodiment of FIG. 16, for example, the sides that define the tapered portion of the elongated aperture 804 are not parallel with the tapered outer walls of the elongated beam 802.

Figure 17:
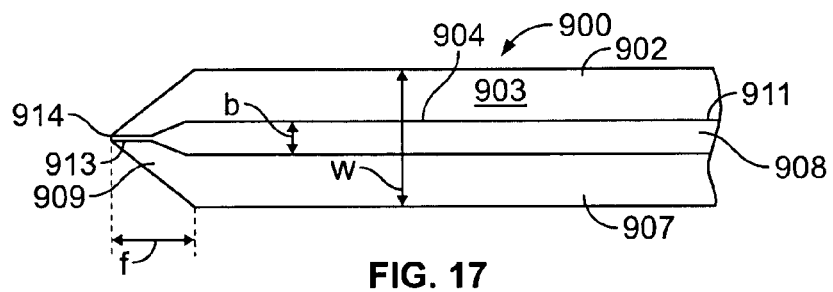

The deposition apparatus 900 illustrated in FIG. 17 is similar to the deposition apparatus 800 illustrated in FIG. 16. However, the elongated aperture 904 of the deposition apparatus 900 illustrated in FIG. 17 does not include a second portion similar to the second portion 212 described above in connection with the embodiment of FIGS. 4 and 5. That is, the elongated aperture 904 has a substantially constant depth d along its length, and no portion or substantially no portion of the elongated aperture 904 extends through the thickness of the elongated beam 902. In some embodiments, the width b of the elongated aperture 904 is substantially constant along a proximal portion of the length of the elongated aperture 904, is gradually reduced along a portion of the length of the elongated aperture 904 toward the terminal end 914 of the elongated beam 102, and then is substantially constant again along a distal portion of the length of the elongated aperture 904. Also in some embodiments, the width b of the elongated aperture 904 is greatest in the proximal portion 911 of the elongated aperture 904, and is narrowed in the distal portion 913 of the elongated aperture 904.

Unlike the deposition apparatus 800 illustrated in FIG. 16, the location along the length of the elongated aperture 904 at which the elongated aperture 904 begins to taper is coincident with the location at which the elongated beam 902 begins to taper. However, the sides that define the tapered portion of the elongated aperture 904 are not parallel with the outer walls of the tapered portion of the elongated beam 902, although such a relationship is possible in alternative embodiments.

The deposition apparatus 1000 illustrated in FIG. 18 is similar to the deposition apparatus 900 illustrated in FIG. 17. However, with reference to the deposition apparatus 1000 illustrated in FIG. 18, the length of the distal portion 1013 of the elongated aperture 1004 in which the width b of the elongated aperture 1004 is constant is greater than that of the deposition apparatus 900. Furthermore, the sides that define the tapered portion of the elongated aperture 904 are substantially parallel to the outer walls of the tapered portion of the elongated beam 902.

The deposition apparatus 1100 illustrated in FIG. 19 has an elongated aperture 1104 that does not extend the length of the elongated beam 1102, and is not in fluid communication with an additional reservoir. Instead, the proximal portion 1111 of the elongated aperture 1104 can serve as a reservoir 1106 of the deposition apparatus 1100. Also with reference to FIG. 19, the elongated beam 1102 can taper along any part or all of its length. For example, the elongated beam 1102 illustrated in FIG. 19 tapers along a length f that is longer than in other embodiments.

Similar to some of the deposition apparatuses described above, the width b of the elongated aperture 1104 can be substantially constant along at least a portion of its length, and can tapers toward the terminal end 1114 of the elongated beam 1102, followed by a portion that is substantially constant along a distal portion of the length of the elongated aperture 1104. In addition, the elongated aperture 1104 can include a first portion 1110 having a depth, and a second portion 1112 that extends through the thickness of the elongated beam 1102 and having a depth equal to or substantially equal to the thickness of the elongated beam 1102.

In some embodiments, the elongated aperture 1104 begins tapering at a location along its length that is not coincident with the location at which the elongated beam 1102 begins tapering, although a coincident relationship between these locations is possible in alternative embodiments. Also, the sides that define the tapered portion of the elongated aperture 1104 can be substantially parallel with the outer walls of the tapered portion of the elongated beam 1102 as shown in FIG. 19, although this relationship is not required in other embodiments.

The deposition apparatus 1200 illustrated in FIG. 20 is similar to the deposition apparatus 1100 illustrated in FIG. 19. However, with reference to the deposition apparatus illustrated in FIG. 20, the elongated aperture 1204 is in fluid communication with an upstream reservoir (not shown). That is, the proximal portion 1213 of the elongated aperture 1204 can be in fluid communication with a reservoir (not shown) defined in the elongated beam 1202 and/or a support portion (also not shown). The proximal portion 1213 of the elongated aperture 1204 illustrated in FIG. 20 does not serve as the reservoir of the deposition apparatus 1200.

Figure 21:
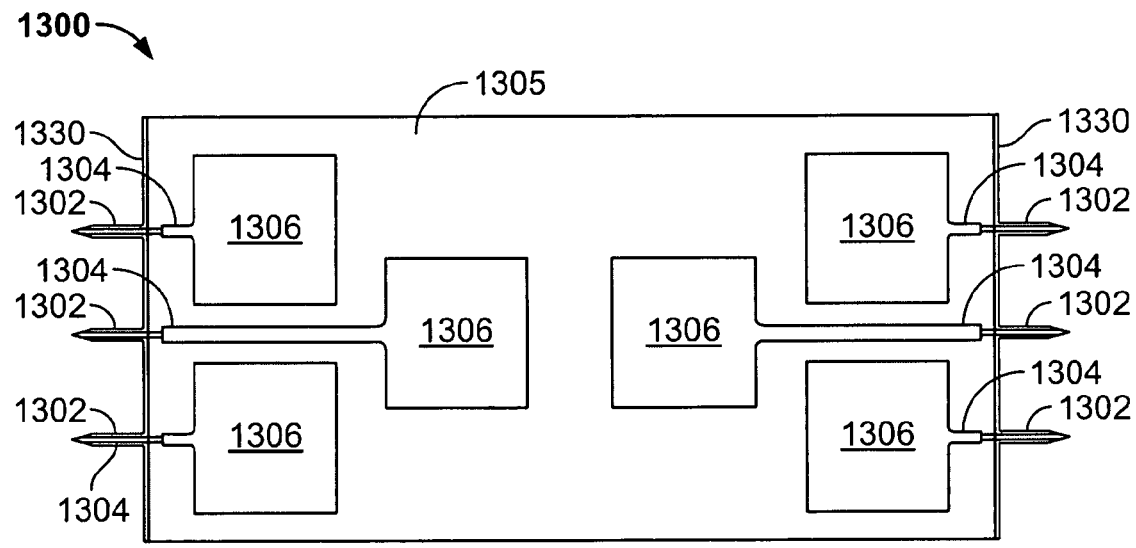
FIG. 21 is a top view of a deposition apparatus according to another embodiment of the present invention.
Figure 22:
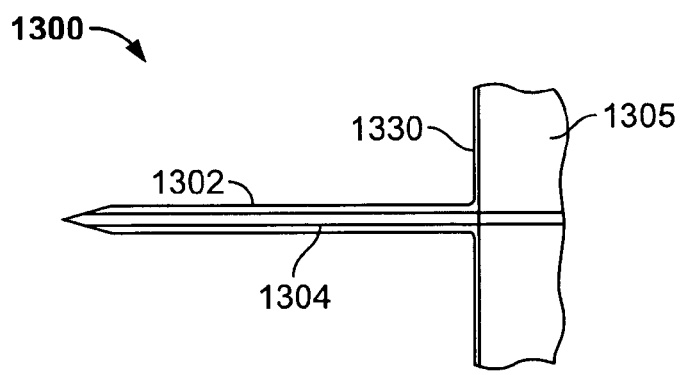
FIG. 22 is a detail top view of the deposition apparatus of FIG. 21.

FIGS. 21 and 22 illustrate another deposition apparatus 1300 according to the present invention, wherein like numerals represent like elements. The deposition apparatus 1300 shares many of the same elements and features described above with reference to the illustrated embodiment of FIGS. 1-3. Accordingly, elements and features corresponding to elements and features in the illustrated embodiment of FIGS. 1-3 are provided with the same reference numerals in the 1300 series. Reference is made to the description above accompanying FIGS. 1-3 for a more complete description of the features and elements (and alternatives to such features and elements) of the embodiment illustrated in FIGS. 21 and 22.

In some embodiments of the present invention, and as shown in FIG. 21, the deposition apparatus 1300 can include a support portion 1305 from which two or more elongated beams 1302 extend. By way of example only, the elongated beams 1302 illustrated in FIG. 21 include the same geometry as that of the elongated beam 702 illustrated in FIGS. 14 and 15. Accordingly, it should be understood that any of the elongated beams 102-1202 disclosed herein can be used in the deposition apparatus 1300, and that the elongated beams 1302 are not necessarily all identical. In some embodiments, a variety of elongated beam geometries can be employed in the deposition apparatus 1300. Also, in some embodiments (e.g., see FIG. 21), the support portion 1305 can include a plurality of reservoirs 1306 each being in fluid communication with an elongated aperture 1305 defined in one or more elongated beams 1302. In embodiments of the present invention employing two or more elongated beams 1302, the support portion 1305 can include a reservoir 1306 in fluid communication with two or more elongated apertures 1304 of corresponding elongated beams 1302. Also, in some embodiments, one or more of the elongated beams 1302 can have a reservoir 1306 located at least partially in the elongated beam(s) 1302.

By way of example only, the deposition apparatus 1300 illustrated in FIGS. 21 and 22 includes a total of six elongated beams 1302, with two groups of three elongated beams 1302 extending outwardly from opposite edges 1330 of the support portion 1305. Accordingly, the support portion 1305 can have two identical halves positioned in back-to-back fashion such that the support portion 1305 is symmetrical. In other embodiments, any number of elongated beams can extend from either or both edges 1330 to define a symmetrical or non-symmetrical deposition apparatus 1300. With reference again to the embodiment illustrated in FIGS. 21 and 22, the reservoirs 1306 can be configured such that one reservoir 1306 (e.g., the middle reservoir 1306) of each set of reservoirs 1306 is offset from an adjacent reservoir. In other words, the reservoirs 106 can be positioned such that one reservoir is located a further distance from an edge 1330 of the support portion 1305 than an adjacent reservoir supplying material to an elongated beam 1302 extending from the same edge 1330 of the deposition apparatus 1300. Therefore, the elongated aperture 1304 for one elongated beam 1302 can be longer than an elongated aperture 1304 for one or more adjacent elongated beams 1302 extending from the same edge 1330 of the deposition apparatus 1300. Therefore, material travels a further distance from the offset reservoir 1306 to reach the distal portion 1309 of the corresponding elongated beam 1302 than with the other elongated beams 1302. As a result, in some embodiments (e.g., see FIG. 21), the proximal portion of the elongated aperture 1304 in fluid communication with the offset reservoir 1306 is wider (i.e., the width b is greater) than that of one or more adjacent elongated apertures 1304. If desired, the reservoirs 1306 of the deposition apparatus 1300 can all substantially the same shape and size as one another. However, in some embodiments, the reservoirs 1306 are different sizes and/or shapes.

In some embodiments, two or more elongated beams 1302 extend in a substantially parallel fashion from the deposition apparatus 1300. Also, the plurality of elongated beams 1302 can be oriented at an angle with respect to one another while still being positioned in substantially the same plane. Furthermore, the plurality of elongated beams 1302 can be oriented at varying angles with respect to one another toward and away from a surface 101 onto which material is to be deposited (i.e., wherein the lengths l of the elongated beams 1302 are not all lying in the same plane). In this regard, the elongated beams 1302 can be positioned at varying angles with respect to the surface 101 and with respect to one another.

Figure 23:
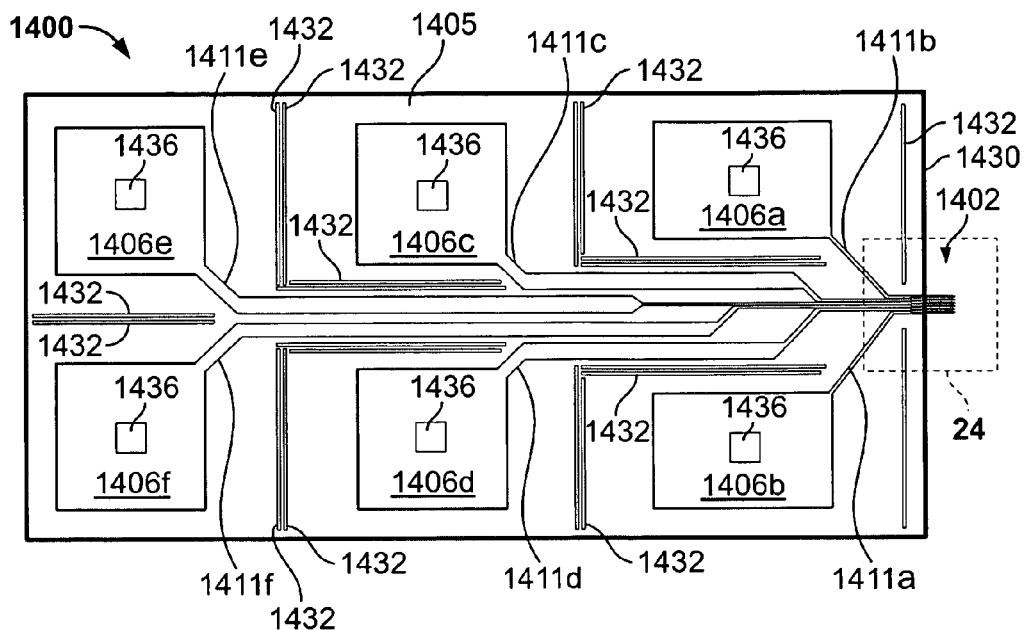
FIG. 23 is a top view of a deposition apparatus according to another embodiment of the present invention.
Figure 24:
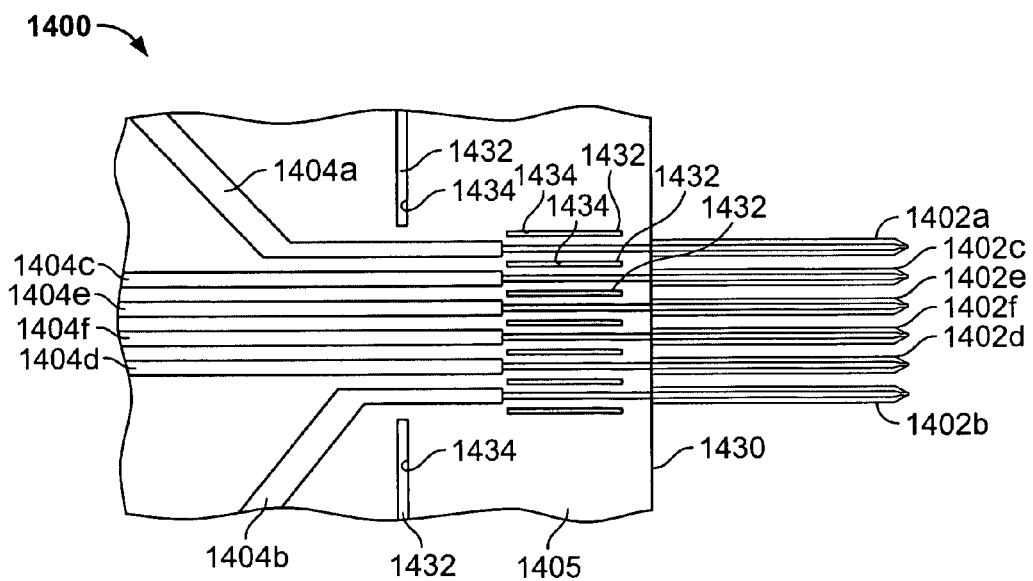
FIG. 24 is a detail top view of the deposition apparatus of FIG. 23.

FIGS. 23 and 24 illustrate another deposition apparatus 1400 according to the present invention, wherein like numerals represent like elements. The deposition apparatus 1400 shares many of the same elements and features described above with reference to the illustrated embodiment of FIGS. 1-3. Accordingly, elements and features corresponding to elements and features in the illustrated embodiment of FIGS. 1-3 are provided with the same reference numerals in the 1400 series. Reference is made to the description above accompanying FIGS. 1-3 for a more complete description of the features and elements (and alternatives to such features and elements) of the embodiment illustrated in FIGS. 23 and 24.

The deposition apparatus 1400 illustrated in FIGS. 23 and 24 includes six elongated beams 1402 that extend from a support portion 1405, although more or fewer elongated beams 1402 can extend in such manner, as desired. By way of example only, the elongated beams 1402 are illustrated as having the same geometry as the elongated beam 902 illustrated in FIG. 17. However, it should be understood that any of the elongated beams 102-1202 disclosed herein can be used in the deposition apparatus 1400, and that the elongated beams 1402 are not necessarily all identical. In some embodiments, a variety of elongated beam geometries can be employed in the deposition apparatus 1400.

The elongated beams 1402 illustrated in FIGS. 23 and 24 can be located in a side-by-side arrangement in which the elongated beams 1402 are relatively close together (e.g., for material deposition at a location substantially smaller than the support portion 1405). In some embodiments, the elongated beams 1402 are located no greater than 20 microns apart from one another. For example, the elongated beams 1402 can be separated from each other by a distance of about 10 microns.

Each of the six elongated beams 1402a-1402f illustrated in FIGS. 23 and 24 includes an elongated aperture 1404a-1404f in fluid communication with a reservoir 1406a-1406f, respectively, such that the deposition apparatus 1400 includes six reservoirs 1406a-1406f positioned in the support portion 1405. As shown in FIG. 23, two forward reservoirs 1406a and 1406b are generally rectangular in shape, whereas the other four reservoirs 1406c-1406f are generally square in shape. The rectangular shape of the forward reservoirs 1406a and 1406b provides room in the support portion 1405 to accommodate the portion of each other elongated aperture 1404c-1404f defined in the support portion 1405. However, it should be understood that the reservoirs 1406a-1406f can include a variety of other shapes and sizes, and can have any size and shape relationship with respect to one another without departing from the spirit and scope of the present invention.

With continued reference to the embodiment illustrated in FIGS. 23 and 24, the forward reservoirs 1406a and 1406b can be positioned closest to an edge 1430 of the support portion 1405 from which the elongated beams 1402a-1402f extend, and therefore, closest to the elongated beams 1402a-1402f. The back reservoirs 1406e and 1406f can be positioned furthest from the edge 1430 of the support portion 1405 and the elongated beams 1402a-1402f, such that material flowing from the back reservoirs 1406e and 1406f to the corresponding elongated beams 1402e and 1402f travels the furthest distance. To better match the flow rates of material to be deposited amongst the elongated apertures 1404a-1404f, the proximal portions 1411e and 1411f of the elongated apertures 1404e and 1404f can be wider than the proximal portions 1411c and 1411d of elongated apertures 1404c and 1404d, which can in turn be wider than the proximal portions 1411a and 1411b of the elongated apertures 1404a and 1404b.

To prevent cross-contamination between adjacent reservoirs 1406 and/or adjacent elongated apertures 1404, the deposition apparatus 1400 can have one or more features preventing material from traveling across the upper surface of the support portion 1405. Such features can be one grooves, ribs, walls, recesses, and the like positioned in any location in which such features prevent such material movement. By way of example only, the deposition apparatus 1400 illustrated in FIGS. 23 and 24 has a plurality of grooves 1432 defined at various positions in an upper surface of the support portion 1405 or defined in or on other portions of the outer surface of the support portion 1405. In some embodiments, the grooves 1432 are v-shaped notches, such that a cross-section of the grooves 1432 is substantially triangular. However, it should be understood that grooves 1432 having any other cross-sectional shape can be employed. The grooves 1432 can each define an inner surface 1434, the material properties (e.g., hydrophobicity/hydrophilicity) of which can be controlled in some embodiments to prevent material from spilling over from one reservoir 1406 or elongated aperture 1404 to another reservoir 1406 or elongated aperture 1404. In some embodiments, the inner surface 1434 is more hydrophobic than one or more of the outer surfaces of the support portion 1405. For example, in some embodiments, the inner surface 1434 comprises silicon, and the adjacent portion of the outer surface 1416 comprises silicon dioxide. As another example, in some embodiments, the inner surface 1434 and the adjacent portion of the outer surface 1416 comprises silicon, and an adjacent reservoir 1406 or elongated aperture 1404 comprises silicon dioxide.

With continued reference to the embodiment illustrated in FIGS. 23 and 24, in some embodiments, one or more of the reservoirs 1406 includes a protrusion 1436 that extends from a bottom surface of the reservoir 1406. The height of each protrusion 1406 can be the same as the depth of the corresponding reservoir 1406, or the height of each protrusion 1406 can be greater or less than the depth D of the corresponding reservoir 1406. The protrusion 1436 can be used to facilitate filling the reservoir 1406, such as, for example, during back-loading operations with a pipette (not shown). In such embodiments, the protrusion 1436 can be dimensioned to fit within the end of a pipette tip, and can initiate fluid flow from the pipette tip into the reservoir 1406. The protrusion 1436 can also maintain the pipette tip in a proper position relative to the deposition apparatus 1400 during filling of the reservoir 1406 in order to prevent the pipette tip from slipping during filling and causing damage to any portion of the deposition apparatus 1400.

Figure 25:
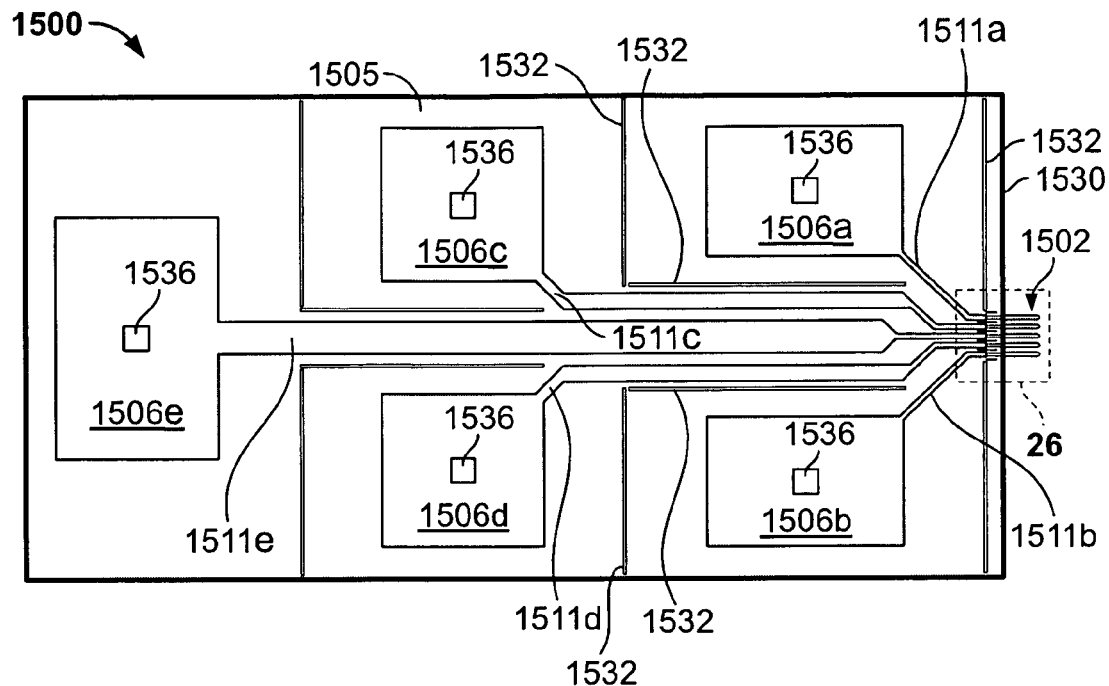
FIG. 25 is a top view of a deposition apparatus according to another embodiment of the present invention.
Figure 26:
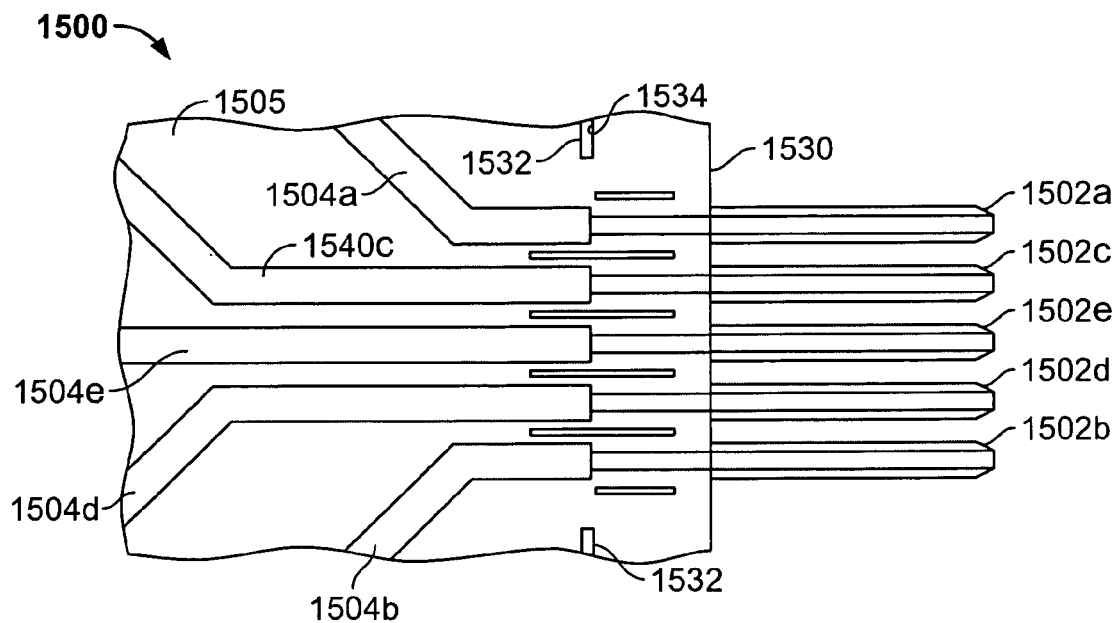
FIG. 26 is a detail top view of the deposition apparatus of FIG. 25.

FIGS. 25 and 26 illustrate another deposition apparatus 1500 according to the present invention, wherein like numerals represent like elements. The deposition apparatus 1500 shares many of the same elements and features described above with reference to the illustrated embodiment of FIGS. 1-3 and 23-24. Accordingly, elements and features corresponding to elements and features in the illustrated embodiment of FIGS. 1-3 and 23-24 are provided with the same reference numerals in the 1500 series. Reference is made to the description above accompanying FIGS. 1-3 and 23-24 for a more complete description of the features and elements (and alternatives to such features and elements) of the embodiment illustrated in FIGS. 25-26.

In the illustrated embodiment of FIGS. 25 and 26, the deposition apparatus 1500 includes five elongated beams 1502 that extend from a support portion 1505. By way of example only, the elongated beams 1502 are illustrated as having the same geometry as the elongated beam 602 illustrated in FIGS. 12 and 13. However, it should be understood that any of the elongated beams 102-1202 disclosed herein can be used in the deposition apparatus 1500, and that the elongated beams 1502 are not necessarily all identical. In some embodiments, a variety of elongated beam geometries can be employed in the deposition apparatus 1500.

Each of the five elongated beams 1502a-1502e illustrated in FIGS. 25 and 26 includes an elongated aperture 1504a-1504e in fluid communication with a reservoir 1506a-1506e, respectively, such that the deposition apparatus 1500 includes five reservoirs 1506a-1506f positioned in the support portion 1505. As shown in FIG. 25, two forward reservoirs 1506a and 1506b are generally rectangular in shape, whereas the intermediate reservoirs 1506c-1506d are generally square in shape, and the back reservoir 1506e is generally rectangular in shape. The rectangular shape of the forward reservoirs 1506a and 1506b provides room in the support portion 1505 to accommodate the portion of the other elongated apertures 1504c-1504e defined in the support portion 1505. However, it should be understood that the reservoirs 1506a-1506e can include a variety of other shapes and sizes, and can have any size and shape relationship with respect to one another without departing from the spirit and scope of the present invention.

The forward reservoirs 1506a and 1506b of the illustrated deposition apparatus 1500 can be positioned closest to an edge 1530 of the support portion 1505 from which the elongated beams 1502a-1502e extend, and therefore, closest to the elongated beams 1502a-1502e. The back reservoir 1506e can be positioned furthest from the edge 1530 and the elongated beams 1502a-1502e, such that material flowing from the back reservoir 1506e to the corresponding elongated beam 1502e travels the furthest distance. To better match the flow rates of material to be deposited amongst the elongated apertures 1504a-1504e, the proximal portion 1511e of the elongated aperture 1404e can be wider than the proximal portions 1511c and 1511d of elongated apertures 1504c and 1504d, which can be wider than the proximal portions 1511a and 1511b of the elongated apertures 1504a and 1504b. In addition, the position of the back reservoir 1506e (e.g., substantially vertically centered in the support portion 1505) allows the corresponding elongated aperture 1504e to travel to the elongated beam 1502 without turning, whereas the other elongated apertures 1504a-1504d all include at least one bend or turn through which material to be deposited passes. The top of the support portion 1505 illustrated in FIG. 25 is substantially symmetrical with the bottom of the support portion 1505 in FIG. 25. However, it should be noted that other arrangements of reservoirs 1506a-e and elongated apertures 1504a-e also enabling reservoirs 1506a-e to be located at different distances from an edge 1530 of the support portion 1505 (to which material from the reservoirs 1506a-e is supplied) are possible.

Figure 27:
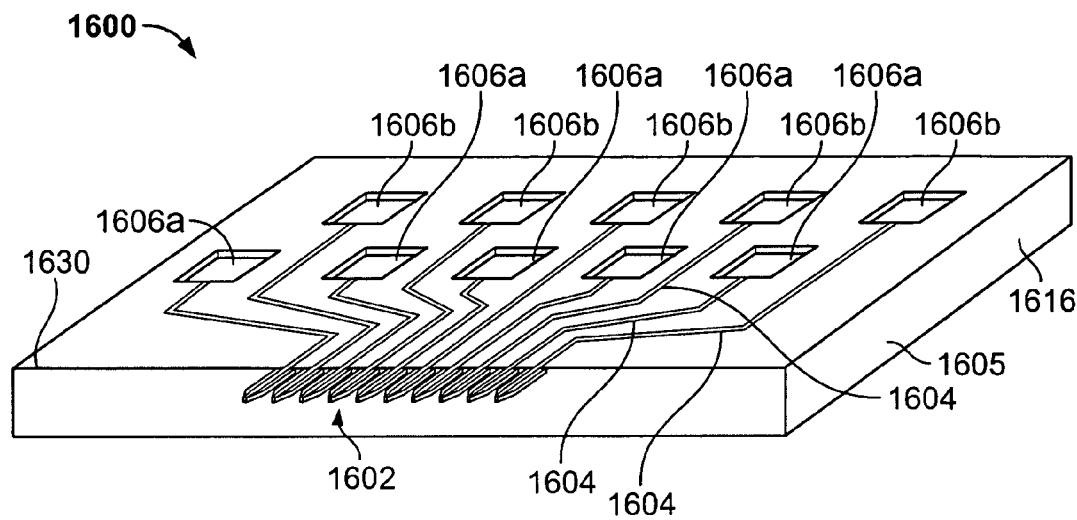
FIG. 27 is a perspective view of a deposition apparatus according to another embodiment of the present invention.

FIG. 27 schematically illustrates another deposition apparatus 1600 according to the present invention, wherein like numerals represent like elements. The deposition apparatus 1600 shares many of the same elements and features described above with reference to the illustrated embodiment of FIGS. 1-3 and 23-24. Accordingly, elements and features corresponding to elements and features in the illustrated embodiment of FIGS. 1-3 and 23-24 are provided with the same reference numerals in the 1600 series. Reference is made to the description above accompanying FIGS. 1-3 and 23-24 for a more complete description of the features and elements (and alternatives to such features and elements) of the embodiment illustrated in FIG. 27.

The deposition apparatus 1600 illustrated in FIGS. 27 and 28 includes ten elongated beams 1602 that extend from a support portion 1605. By way of example only, the elongated beams 1602 are illustrated as having generally the same geometry as the elongated beam 102 illustrated in FIGS. 1-3. However, it should be understood that any of the elongated beams 102-1202 disclosed herein can be used in the deposition apparatus 1600, and that the elongated beams 1602 are not necessarily all identical. In some embodiments, a variety of elongated beam geometries can be employed in the deposition apparatus 1600.

Each of the ten elongated beams 1602 can include an elongated aperture 1604 in fluid communication with a reservoir 1606, such that the deposition apparatus 1600 includes ten reservoirs 1606, each of which is positioned at least partially in the support portion 1605. As shown in FIG. 27, the reservoirs 1606 can include five forward reservoirs 1606a and five back reservoirs 1606b, all of which are generally square in shape. However, it should be understood that the reservoirs 1606 can include a variety of shapes and sizes, and can have any size and shape relationship with respect to one another without departing from the spirit and scope of the present invention.

The forward reservoirs 1606a can each be separated a distance from a forward edge 1630 of the support portion 1605, and the back reservoirs 1606b can each be separated a distance from the forward reservoirs 1606a such that the back reservoirs 1606b are positioned further from the forward edge 1630 of the support portion 1605 than the forward reservoirs 1606a. Accordingly, the elongated apertures 1604b that fluidly connect the back reservoirs 1606b to the corresponding elongated beams 1602b can have wider proximal portions than that of the forward reservoirs 1606a, as described in greater detail above in connection with the deposition apparatuses 1300, 1400 and 1500 of FIGS. 21-26.

FIG. 28 illustrates an example of how a deposition apparatus comprising a plurality of elongated beams (such as the deposition apparatus 1500 illustrated in FIGS. 25 and 26 and described above) can be front-loaded. As shown in FIG. 28, a modified deposition apparatus 1500' does not include elongated beams. Accordingly, the elongated apertures 1504' defined in the support portion 1505' of the deposition apparatus 1500' are in fluid communication with the edge 1530' of the support portion 1505'. The distal portions 1509 of elongated beams 1502 of another deposition apparatus 1500 can be moved into fluid communication with the edge 1530' of the modified deposition apparatus 1500', and with the elongated apertures 1504'. Due to capillary action, control of one or more environmental parameters, and control of material properties of the modified deposition apparatus 1500' and the deposition apparatus 1500, the elongated apertures of the deposition apparatus 1500 can be front-loaded from the elongated apertures 1504' of the modified deposition apparatus 1500' simultaneously.

EXAMPLE 1

Fabrication of Elongated Beams of the Present Invention

The starting material was a 3" double-side polished n-type {100} silicon wafer. Both sides of the wafer were thermally grown with 2-3 microns of $SiO_2$ (wet oxidation). The front side $SiO_2$ layer was used for construction of elongated beams. The back side $SiO_2$ layer was used as a mask for release of the elongated beams in a final silicon anisotropic etching step. The front side $SiO_2$ layer was patterned to define the elongated beams, elongated apertures, and reservoirs. It is not trivial to fabricate a gap with a 1 micron feature size and 3:1 aspect ratio using conventional UV photolithography. To perform this process, a negative photoresist pattern was transferred into a 500 nm thick nickel positive pattern by mask electroplating, and then the nickel metal layer served as a hard mask for underneath $SiO_2$ etching by anisotropic RIE (reactive ion etching). The reactive gases were a mixture of $CHF_3$ (50 SCCM) and $SF_6$ (1 SCCM) at 50 mTorr pressure. 50 W of RF power was used. Since the etching selectivity of $SiO_2$ to nickel was much higher than to photoresist, more precise control of the elongated aperture geometry was possible than if a thick photoresist had been used as a mask for $SiO_2$ etching. After the elongated beams were defined, a 1 micron deep elongated aperture was fabricated by overlay photolithography followed by RIE. Finally, the backside $SiO_2$ window was opened and the elongated beams released by KOH anisotropic etching. The concentration of KOH was about 35 wt % in water, while the processing temperature was about 80° C.

EXAMPLE 2

Sample Preparation and Material Deposition

Purified Cy3-streptavidin (Jackson ImmunoResearch Laboratories, West Grove, Pa.) in phosphate-buffered saline (PBS) with 10% glycerol was used. Glycerol was added to prevent evaporation and to keep the protein hydrated and bioactive. The Cy3 fluorophore allowed monitoring of the streptavidin by fluorescence microscopy after deposition or patterning. Before loading with Cy3-streptavidin, the deposition apparatus was UV/$O_3$ treated using a TIPCLEANER™ (available from BioForce Nanosciences, Inc., Ames, Iowa) for 20 minutes. This process cleaned the inner surface of the elongated aperture and rendered them hydrophilic, thus facilitating filling by the sample. Cy3-streptavidin sample solution (about 1 μl) was delivered into the reservoir on the back side of the cantilever by micropipette. This delivery spontaneously filled the elongated aperture by hydrophilic capillary force. Then the back-loaded deposition apparatus was mounted on a NANOARRAYER™ deposition system for patterning. Dithiobis-succinimidyl undecanoate (DSU) (Dojindo, Japan)-treated gold surfaces were used as deposition substrates. DSU forms a self-assembling monolayer on gold surfaces through the strong chemical interactions between sulfur and gold as well as the hydrophobic packing of alkyl chains. The exposed amine-reactive succinimide group enabled the covalent binding of Cy3-streptavidin to the deposition substrate.

All experiments were performed under ambient conditions with a relative humidity of about 35-40% and a temperature of about 23-24° C. After patterning, a Nikon TE 2000U inverted microscope equipped with a 40× oil objective and Chroma Technology (Vermont) filter set for Cy3™ (#41007a) was used to visualize the Cy3-streptavidin patterned on DSU/gold. Images were acquired with a Hamamatsu (Japan) ORCA ER cooled CCD camera. A similar procedure was used to directly image the fluorescent sample in the elongated aperture of the microfabricated deposition apparatus. Fluorescent array images were analyzed for net intensity, diameter, area, and coefficient of variance with the Array Pro Analyzer v4.5 software package from Media Cybernetics (Carlsbad, Calif.).

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

What is claimed is:

1. An apparatus for depositing material onto a surface, the apparatus comprising:
a base having a width;
a substantially planar elongated beam having a proximal portion extending from the base and a distal portion located a distance from the proximal portion such that the substantially planar elongated beam forms a cantilever with respect to the base, the substantially planar elongated beam having a length of no greater than about 2 mm, the substantially planar elongated beam having a width and being smaller than the width of the base and a terminal end, the width of the substantially planar elongated beam adjacent the terminal end being tapered toward the terminal end;
an elongated aperture defined in the substantially planar elongated beam, the elongated aperture at least partially defining an inner surface dimensioned to move liquid along the elongated aperture by passive adsorption, the elongated aperture having a distal portion from which material is deposited onto the surface; and
a reservoir in fluid communication with a proximal portion of the elongated aperture, wherein the reservoir is configured to retain the material to be deposited, and wherein the reservoir is wider than the substantially planar elongated beam and is positioned in the base,
wherein the substantially planar elongated beam is one of a plurality of substantially planar elongated beams extending from the base to facilitate simultaneous deposition of at least one material onto the surface.

2. The apparatus of claim 1, wherein the length of the substantially planar elongated beam is no less than about 100 nm and is no greater than about 1 mm.

3. The apparatus of claim 1, wherein at least a portion of the elongated aperture is tapered in width along at least a portion of the elongated aperture.

4. The apparatus of claim 1, wherein the elongated aperture extends to and terminates at a location disposed a distance from a terminal end of substantially planar the elongated beam.

5. The apparatus of claim 1, wherein the elongated aperture extends to and through a terminal end of the substantially planar elongated beam.

6. The apparatus of claim 1, wherein:
the substantially planar elongated beam includes an upper surface and a lower surface; and
the upper surface and the lower surface are substantially parallel, flat, and planar along the length of substantially planar the elongated beam.

7. The apparatus of claim 1, wherein:
the substantially planar elongated beam has a thickness,
the elongated aperture includes a first portion having a depth less than the thickness of the substantially planar elongated beam, and
the elongated aperture includes a second portion having a depth equal to about the thickness of the substantially planar elongated beam.

8. An apparatus for depositing material onto a surface, the apparatus comprising:
a base having a width;
a plurality of elongated beams each having a width and being smaller than the width of the base extending from the base in a cantilevered configuration, each of the plurality of elongated beams oriented at an acute angle with respect to the surface and having
a substantially planar upper surface along substantially its entire length;
a substantially planar lower surface along substantially its entire length;
a proximal portion extending from the base;
a distal portion located a distance from the proximal portion; and
an elongated aperture defined in the elongated beam, the elongated aperture at least partially defining an inner surface adapted to facilitate movement of the material along the elongated aperture by passive adsorption, and a distal portion adapted for at least one of material loading into the elongated beam and material deposition from the elongated beam;
wherein each elongated aperture is in fluid communication with a reservoir located in the base and configured to retain the material.

9. The apparatus of claim 8, wherein:
each elongated beam has a thickness; and
at least a portion of at least one elongated aperture extends through the thickness of the respective elongated beam.

10. The apparatus of claim 8, wherein at least a portion of at least one elongated aperture is tapered toward a terminal end of the respective elongated beam.

11. The apparatus of claim 8, wherein at least a portion of at least one elongated beam is tapered toward a terminal end of the respective elongated beam.

12. The apparatus of claim 8, wherein:
each elongated beam has a length no greater than about 2 mm; and
the thickness of each elongated beam is no less than about 2 microns and is no greater than about 3 microns.

13. The apparatus of claim 8, wherein the distal portion of each elongated aperture is no greater than about 1 micron in width.

14. The apparatus of claim 8, wherein the distal portion of each elongated beam and the distal portion of each elongated aperture are shaped to produce a spot having a diameter no less than about 2 microns and no greater than about 3 microns.

15. The apparatus of claim 8, wherein each elongated aperture is in fluid communication with a respective reservoir located in the base and configured to retain the material.

* * * * *